US012496554B2

United States Patent
Waheed et al.

(10) Patent No.: US 12,496,554 B2
(45) Date of Patent: Dec. 16, 2025

(54) TRIAMINE-FUNCTIONALIZED MCM-41-BASED FILTRATION MEMBRANE

(71) Applicant: KING FAHD UNIVERSITY OF PETROLEUM AND MINERALS, Dhahran (SA)

(72) Inventors: Abdul Waheed, Dhahran (SA); Umair Baig, Dhahran (SA); Shehzada Muhammad Sajid Jillani, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 434 days.

(21) Appl. No.: 18/333,663

(22) Filed: Jun. 13, 2023

(65) Prior Publication Data
US 2024/0416287 A1 Dec. 19, 2024

(51) Int. Cl.
*B01D 67/00* (2006.01)
*B01D 61/02* (2006.01)
(Continued)

(52) U.S. Cl.
CPC ....... *B01D 67/0006* (2013.01); *B01D 61/027* (2013.01); *B01D 67/0013* (2013.01);
(Continued)

(58) Field of Classification Search
None
See application file for complete search history.

(56) References Cited

U.S. PATENT DOCUMENTS

| 10,363,546 | B2 | 7/2019 | Song et al. |
|---|---|---|---|
| 2007/0022877 | A1 | 2/2007 | Marand et al. |
| 2015/0321151 | A1 | 11/2015 | Lee et al. |
| 2020/0207986 | A1* | 7/2020 | Menceloglu ........... C08G 77/26 |
| 2024/0375063 | A1* | 11/2024 | Jillani ................ B01D 67/0079 |

FOREIGN PATENT DOCUMENTS

| CN | 106943902 A | 7/2017 |
|---|---|---|
| CN | 111001309 A | 4/2020 |

(Continued)

OTHER PUBLICATIONS

Zhu et al. ; Preparation of spherical mesoporous aminopropyl-functionalized MCM-41 and its application in polyamide thin film nanocomposite reverse osmosis membranes ; Desalination and Water Treatment vol. 57, Issue 53 ; 4 Pages ; Abstract Only.
(Continued)

*Primary Examiner* — Krishnan S Menon
(74) *Attorney, Agent, or Firm* — Oblon, McClelland, Maier & Neustadt, L.L.P.

(57) ABSTRACT

A filtration membrane including a first layer having a triamine-functionalized polysilicate mesoporous material, a second layer including a polysulfone; and a third layer including a polyester terephthalate is described. An orthosilicate group of the triamine-functionalized polysilicate mesoporous material is bonded to a silicon atom of a silicon-containing triamine to form a triamine-functionalized polysilicate backbone, wherein the silicon-containing triamine and one or more tetramines are covalently cross-linked with terephthaloyl chloride to form a polyamide, and wherein the triamine-functionalized polysilicate mesoporous material has a hierarchical structure of MCM-41. The membrane is adapted for use selected from the use group consisting of oil and water separation, water treatment, desalination, and pharmaceutical filtration.

20 Claims, 23 Drawing Sheets

(51) Int. Cl.
    *B01D 69/02* (2006.01)
    *B01D 69/12* (2006.01)
    *B01D 71/48* (2006.01)
    *B01D 71/56* (2006.01)
    *B01D 71/68* (2006.01)
    *C02F 1/44* (2023.01)
    *C02F 101/10* (2006.01)
    *C02F 101/38* (2006.01)
    *C02F 103/34* (2006.01)

(52) U.S. Cl.
    CPC ......... *B01D 69/02* (2013.01); *B01D 69/1216* (2022.08); *B01D 71/48* (2013.01); *B01D 71/56* (2013.01); *B01D 71/68* (2013.01); *C02F 1/442* (2013.01); *B01D 2323/30* (2013.01); *B01D 2323/36* (2013.01); *B01D 2323/56* (2022.08); *B01D 2325/06* (2013.01); *C02F 2101/101* (2013.01); *C02F 2101/38* (2013.01); *C02F 2101/40* (2013.01); *C02F 2103/343* (2013.01)

(56) References Cited

FOREIGN PATENT DOCUMENTS

| CN | 114768555 A | | 7/2022 | |
|---|---|---|---|---|
| CN | 115253715 A | * | 11/2022 | ......... B01D 67/0083 |
| WO | WO-2023224868 A2 | * | 11/2023 | ......... B01D 67/0079 |

OTHER PUBLICATIONS

Miricioiu et al. ; High Selective Mixed Membranes Based on Mesoporous MCM-41 and MCM-41-NH2 Particles in a Polysulfone Matrix ; Frontiers in Chemistry, vol. 7 ; Jun. 17, 2019 ; 13 Pages.

Belmabkhout et al. ; Simultaneous Adsorption of H2S and CO2 on Triamine-Grafted Pore-Expanded Mesoporous MCM-41 Silica ; Enery Fuels 25, 3 ; Feb. 4, 2011 ; 10 Pages ; Abstract Only.

Ramachanandhran et al. ; Preparation and Separation Performance Studies on Composite Polyamide Membranes using different Amine Systems and Support Membranes ; Journal of Polymer Materials 26(2) ; Apr. 2009 ; 1 Page ; Abstract Only.

* cited by examiner

Proposed structure of ISM active layer

TRIAMINE-FUNCTIONALIZED MCM-41-BASED FILTRATION MEMBRANE

STATEMENT REGARDING PRIOR DISCLOSURE BY THE INVENTORS

Aspects of the present disclosure were describes in an article titled "Optimization of amine functionalization of MCM-41 for its covalent decoration in nanofiltration membranes for purification of saline- and micropollutant-contaminated feeds" published in Issue 5, Environmental Science: Water Research & Technology on Mar. 10, 2023, which is incorporated herein by reference in its entirety.

STATEMENT OF ACKNOWLEDGEMENT

The inventors acknowledge the support provided by the Interdisciplinary Research Center for Membranes and Water Security, King Fahd University of Petroleum and Minerals, Saudi Arabia, through Project INMW2205

BACKGROUND

Technical Field

The present disclosure relates to membranes, and more particularly, relates to triamine functionalized MCM-41-based filtration membranes for the removal of hazardous pollutants from water.

Discussion of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Due to the huge potential of treating and recovering precious water from industrial and domestic wastewater streams, various strategies and methodologies have been developed and implemented. Relevant treatment strategies include air floatation, coagulation, adsorption, precipitation, chemical oxidation, and biological degradation of the pollutants. These strategies have limitations, such as the generation of sludge and toxic byproduct pollutants generated from chemical oxidation. The treatment strategy of separation by membranes, including microfiltration (MF) membranes, ultrafiltration (UF) membranes, nanofiltration (NF) membranes, reverse osmosis (RO) membranes, and the like, according to a pore size thereof, represents a growing area in wastewater treatment. Nanofiltration membranes have a capacity for treating a variety of feeds where the size of the solutes range from 200 Da to 1000 Da. Progress has been made in improving the performance of the NF membranes. The NF membranes have several advantages, such as ease of operation, energy efficiency, cost-effectiveness, tuneability, lesser carbon footprint, adjustability to different filtration modules, and long-term stability. During the desalting of saline wastewater, NF membranes can remove divalent salts while allowing the monovalent salts to pass through. NF membranes can also remove various pollutants, such as hazardous dyes and toxic metal ions, micropollutants, such as drugs and pharmaceuticals, dissolved oil droplets, and salts from water.

Treating contaminated wastewater purifies and recovers water, while also minimizes or eliminates several water-borne diseases. These water-borne diseases affect humans and animals as pollutants become part of food chains in the living ecosystems and, hence, are considered a severe environmental threat. In addition, wastewater has also been regarded as "dirty gold" as it can serve as a source of fresh water to reduce water stress and scarcity on planet earth. Similarly, alternative freshwater sources include saline wastewater, brackish water, and seawater. NF membranes have the potential to treat all versions of saline water.

Removing micropollutants, such as pharmaceuticals, from entering water bodies and wastewater streams is an up and coming area of research. This area has yet to be explored much in literature, which has led to an increasing concentration of drugs in water bodies. The presence of drugs, such as antibiotics, can lead to increased antibiotic resistance, which could increase multidrug-resistant (MDR) bacterial strains. The current treatment technologies, such as ozonation, are efficient in treating micropollutants by degrading the pharmaceuticals; however, ozonation has a disadvantage of degradation byproducts left in the treated water stream. NF membranes have a vast potential for treating a wastewater stream containing micropollutants, such as drugs.

Given the potential of NF membranes for treating different feeds, research has been dedicated to enhancing the performance of polymeric NF membranes. Other polymers, such as polysulfone (PSf), polyethersulfone (PES), polyvinylidene fluoride (PVDF), and polyacrylonitrile (PAN), have been extensively used in membrane fabrication. These polymers have high chemical, thermal, and mechanical stability. In addition, numerous fillers, such as nanomaterials, porous organic polymers (POPs), polymers of intrinsic microporosity (PIMs), and inorganic fillers, such as zeolites, have been used to enhance the performance of the polymeric NF membranes.

MCM-41 has been utilized in the fabrication of several membranes for different applications. MCM-41 is a mesoporous silica material that belongs to a family of mesoporous materials, i.e., M41S, and has advantageous features such as large surface area, highly ordered hexagonal structure, well-defined pore size and structure, and ease of preparation. Different versions of MCM-41 have been used in other applications, such as photocatalytic processes and heavy metals removal. Work by Bao et al. (Y. Bao, X. Yan, W. Du, X. Xie, Z. Pan, J. Zhou, and L. Li, *Chem. Eng. J.*, 2015, 281, 460-467, incorporated herein by reference in its entirety) used amino-functionalized MCM-41 ($NH_2$-MCM-41) to amend UF membranes for removal of Cr(VI) and Cu(II) from the aqueous solutions. Similarly, an adsorptive membrane modified with $NH_2$-MCM-41 was applied for the separation of gases. Fillers like $NH_2$-MCM-41, when physically added to the UF support or active layer leads to mixed matrix membranes. These mixed matrix membranes lack a stable covalent bond between the fillers and polymers of the NF membranes.

The physical mixing of the fillers results in several disadvantages such as agglomeration and defects in the membrane augmented by the leaching of nanofillers during high-pressure filtration experiments. The mixing of the fillers suffers from an issue of incompatibility between the polymeric matrix and the fillers used during membrane fabrication. The incorporation of zeolites, carbon nanotubes, metal-organic frameworks (MOFs), silica, and carbon molecular sieves has thus not been shown to be an excellent option. This is attributable to the incompatible nature of such nanofillers to the different polymers, such as PSf, PES, PAN, and PVDF. The incompatibility compromises the selectivity of the membranes.

Accordingly, an object of the present disclosure is to provide a filtration membrane by appropriately functionalizing and covalently crosslinking the components of the active layers in the membrane to enhance selectivity.

SUMMARY

In an exemplary embodiment of the present disclosure, a filtration membrane is disclosed. The filtration membrane includes a first layer including a triamine-functionalized polysilicate mesoporous material, wherein an orthosilicate group of the triamine-functionalized polysilicate mesoporous material is bonded to a silicon atom of a silicon-containing triamine to form a triamine-functionalized polysilicate backbone, wherein the silicon-containing triamine and one or more tetramines are covalently cross-linked with terephthaloyl chloride to form a polyamide, wherein the triamine-functionalized polysilicate mesoporous material has a hierarchical structure of MCM-41; a second layer comprising a polysulfone; and a third layer comprising a polyester terephthalate.

In some embodiments, the triamine-functionalized polysilicate mesoporous material contains an orthosilicate group covalently bonded to a terminal silicon atom of the silicon-containing triamine through a Si—O—Si—O—Si linkage as an integrated part of an orthosilicate network, wherein the silicon-containing triamine is an $N^1$-(3-trimethoxysilylpropyl)diethyltriamine.

In some embodiments, the triamine-functionalized polysilicate mesoporous material contains an orthosilicate group covalently bonded to a terminal silicon atom of the silicon-containing triamine through an Si—O—Si—O—Si linkage as an endcap of the orthosilicate network, wherein the silicon-containing triamine is the $N^1$-(3-trimethoxysilylpropyl)diethyltriamine.

In some embodiments, the silicon-containing triamine and one or more tetramines are covalently cross-linked with terephthaloyl chloride through at least one of a primary amine of the silicon-containing triamine and a secondary amine of the silicon-containing triamine, and at least one of a primary amine of the tetramine and a secondary amine of the tetramine, wherein the tetramine is an N,N'-bis(3-aminopropyl)ethylenediamine.

In some embodiments, one or more of a first tetramine and one or more of a second tetramine are covalently cross-linked with terephthaloyl chloride through at least one of a primary amine of the first tetramine and a secondary amine of the first tetramine, and at least one of a primary amine of the second tetramine and a secondary amine of the second tetramine, wherein the first tetramine and the second tetramine is the N,N'-bis(3-aminopropyl)ethylenediamine.

In some embodiments, the triamine-functionalized polysilicate mesoporous material has a porous, granular morphology with an average particle size of 10 to 50 nanometers (nm) in diameter.

In some embodiments, carbon is present in the first layer in an amount of 40 to 70 percent, oxygen is present in the first layer in an amount of 25 to 40 percent, silicon is present in the first layer in an amount of 5 to 20 percent, and nitrogen is present in the first layer in an amount of 2 to 8 percent based on a total elemental composition of the first layer.

In some embodiments, the membrane has an average surface roughness of 15 to 45 nm.

In some embodiments, the membrane has a water contact angle of 55° to 95°.

In some embodiments, the membrane has a permeate rate of flux of 30 to 60 liters per square meter per hour ($Lm^{-2}h^{-1}$) at a feed pressure of 25 bar.

In some embodiments, the triamine-functionalized polysilicate mesoporous material of the first layer is made by a process comprising: stirring cetyltrimethylammonium bromide, sodium hydroxide, and water to form a first mixture; adding tetraethyl orthosilicate to the first mixture to form a second mixture; adding $N^1$-(3-trimethoxysilylpropyl)diethyltriamine to the second mixture to form a third mixture; centrifuging the third mixture; decanting an organic solution from the third mixture to leave a substance; and drying the substance to form the triamine-functionalized polysilicate mesoporous material of the first layer.

In some embodiments, the triamine-functionalized polysilicate mesoporous material may be functionalized with the silicon-containing triamine during an in situ procedure of the synthesis of the hierarchical structure of MCM-41 and a post-synthesis procedure of the synthesis of the hierarchical structure of MCM-41.

In some embodiments, the membrane is made by a process comprising: mixing the triamine-functionalized polysilicate mesoporous material, N,N'-bis(3 aminopropyl) ethylenediamine, triethylamine, and water to form an amine solution; sonicating the amine solution; dissolving terephthaloyl chloride in an n-hexane to form a crosslinker solution; casting the polysulfone on the polyester terephthalate with wet phase inversion to form a support; attaching the support to a glass surface to form a base foundation; dipping the base foundation in the amine solution to form a complex; and dipping the complex in the crosslinker solution to form the membrane.

In some embodiments, the first layer has a uniform, globular morphology with an average particle size of 10 to 80 nm in diameter.

In some embodiments, a method of filtration is disclosed. The method includes wetting the filtration membrane; and contacting the filtration membrane with a contaminated solution, wherein the contaminated solution comprises water and a pollutant.

In some embodiments, the method includes contacting the filtration membrane with the contaminated solution results in a rejection percentage of 50 to 97 percent based on an initial weight of the pollutant at a pressure of 15 bar, wherein the pollutant is an ionic salt.

In some embodiments, the method includes contacting the filtration membrane with the contaminated solution results in a rejection percentage of 35 to 95 percent based on an initial weight of the pollutant at a pressure of 15 bar, wherein the pollutant is a pharmaceutically active compound.

In some embodiments, the pollutant is one or more ionic salts selected from the group consisting of $MgCl_2$, $CaCl_2$, $MgSO_4$, $Na_2SO_4$, and NaCl. In some embodiments, the pollutant is one or more pharmaceutically active compounds selected from the group consisting of caffeine, sulfamethoxazole, amitriptyline, and loperamide.

In some embodiments, the membrane is adapted for use selected from the use group consisting of oil and water separation, water treatment, desalination, and pharmaceutical filtration.

These and other aspects of non-limiting embodiments of the present disclosure will become apparent to those skilled in the art upon review of the following description of specific non-limiting embodiments of the disclosure in conjunction with the accompanying drawings.

BRIEF DESCRIPTION OF THE DRAWINGS

A better understanding of embodiments of the present disclosure (including alternatives and/or variations thereof) may be obtained with reference to the detailed description of the embodiments along with the following drawings, in which.

DETAILED DESCRIPTION

Figure 1:
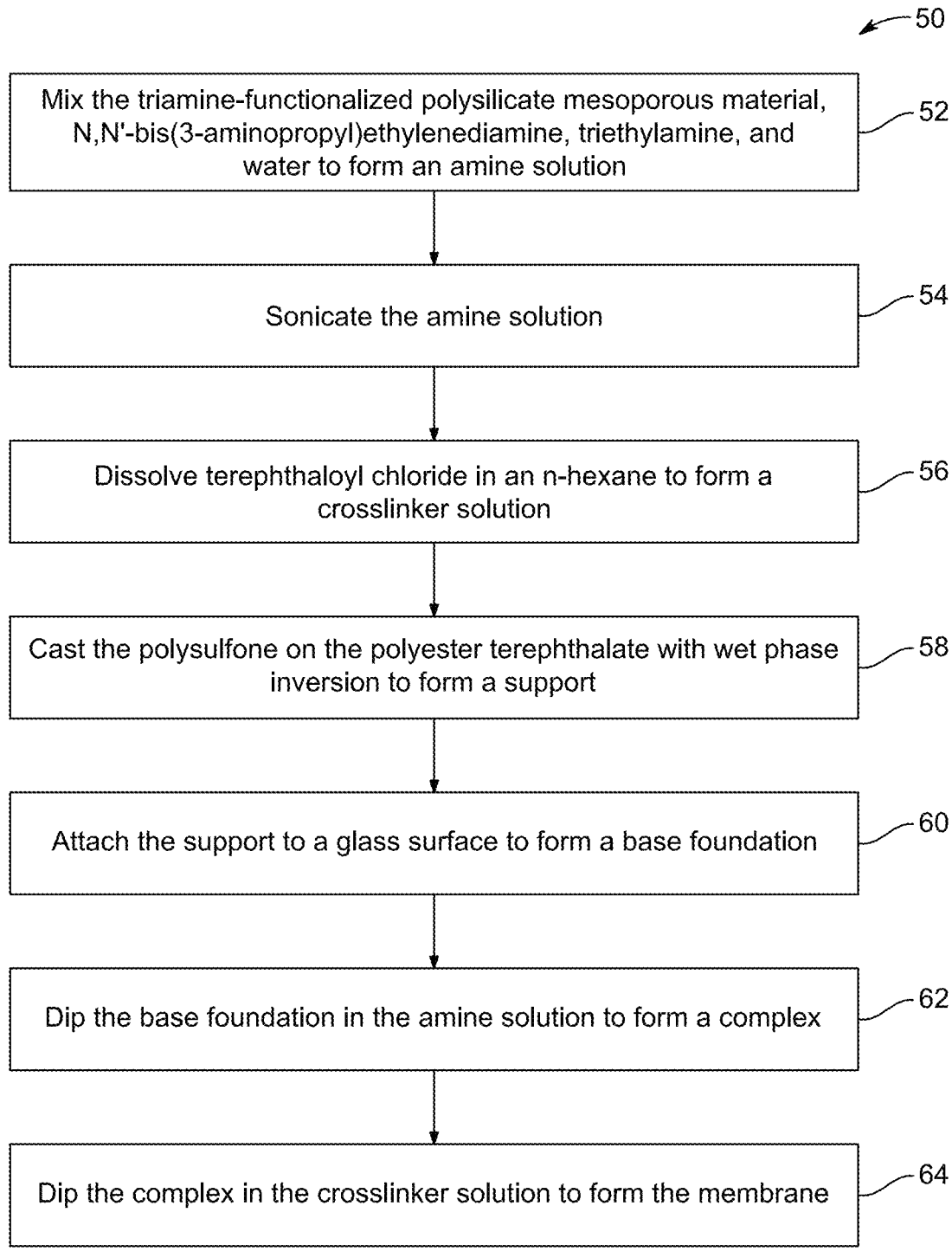
FIG. 1 is a flowchart depicting a method of making a membrane, according to an aspect of the present disclosure.

In the following description, it is understood that other embodiments may be utilized, and structural and operational changes may be made without departure from the scope of the present embodiments disclosed herein.

Reference will now be made in detail to specific embodiments or features, examples of which are illustrated in the accompanying drawings. Wherever possible, corresponding, or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Furthermore, the terms "approximately," "approximate," "about," and similar terms generally refer to ranges that include the identified value within a margin of 20%, 10%, or preferably 5%, and any values therebetween.

As used herein, the singular terms "a", "an", and "the" include plural referents, unless otherwise specified. Likewise, the plural term "multilayer" as used herein includes a singular referent comprising a monolithic or monolayer structure, unless specified otherwise.

As used herein, the term "membrane" refers to a porous structure that is capable of separating components of a homogeneous or heterogeneous fluid. Unless specified otherwise, the term "porous" as used herein refers to microporous, mesoporous, microporous, and combinations thereof. As used herein, the term "micropore" refers to a pore with a size ≤2 nm, the term "mesopore" refers to a pore size between 2 and 50 nm, and the term "macropore" refers to a pore with a size ≥50 nm. In particular, "pores" in the sense of the present disclosure indicate voids allowing fluid communication between different sides of the structure. More particular in use when a homogeneous or heterogeneous fluid is passed through the membrane, some components of the fluid can pass through the pores of the membrane into a "permeate stream", some components of the fluid can be retained by the membrane and can thus accumulate in a "retentate" and/or some components of the fluid can be rejected by the membrane into a "rejection stream". Membranes can be of various thicknesses, with homogeneous or heterogeneous structures. Membranes can be in the form of flat sheets or bundles of hollow fibers. Membranes can also be in various configurations including, but not limited to, spiral wound, tubular, hollow fiber, and other configurations identifiable to a skilled person upon a reading of the present disclosure. Membranes can also be classified according to their pore diameter. Membranes can be neutral or charged. Particle transport can be active or passive, with the latter facilitated by pressure, concentration, chemical or electrical gradients of the membrane process, and the like.

As used herein, the term "surfactant" refers to a chemical compound that decreases the surface tension or interfacial tension between two liquids, a liquid and a gas, or a liquid and a solid. In an embodiment the surfactant may refer to an organic chemical that, when added to a liquid, changes the properties of that liquid at a surface. In an embodiment, the surfactant may function as an emulsifier, a wetting agent, a detergent, a foaming agent, a dispersant, a combination thereof, and the like. In some embodiments, the surfactant may be ionic, nonionic, amphiphilic, and the like. In an embodiment, the surfactant is amphiphilic and comprises a hydrophilic group and a hydrophobic group. In an embodiment, surfactant is added to an aqueous phase and the surfactants form aggregates, such as micelles, where the hydrophobic group of the surfactant form the core of the aggregate and the hydrophilic group of the surfactant are in contact with the surrounding liquid. In other embodiments, different types of aggregates may be formed, such as spherical micelles, cylindrical micelles, lipid bilayers, and the like. Aggregate shape and size may be influenced by the chemical composition, structure, and amount of the surfactant.

Aspects of the present disclosure relate to fabricating a filtration membrane (also called membrane) to target multiple application areas, such as desalting and removing micropollutants. The filtration membrane may be applied for oil-water separation, desalination, wastewater treatment, and the like. In one example, the filtration membrane was fabricated by covalently decorating MCM-41 as an active layer on a support, by an interfacial polymerization reaction (IP). Versions of MCM-41 were synthesized using in situ and post-synthetic functionalization procedures, yielding in situ functionalized MCM-41 (ISM) zeolite and post-synthetically functionalized MCM-41 (PSM) zeolite. The functionalization of the different versions was carried out by using $N^1$-(3-trimethoxysilylpropyl) diethylenetriamine (NTSDETA). The versions of the MCM-41 were covalently decorated in an active layer of the membrane. The active layer of the membrane was covalently decorated with N,N'-bis(3-aminopropyl)ethylenediamine (BAPEDA) and terephthaloyl (TPC) during IP on a polysulfone/polyester terephthalate (PS/PET) support. The filtration membrane was thoroughly characterized by attenuated total reflection Fourier transform infrared (ATR-FTIR) spectroscopy, scanning electron microscopy (SEM), energy dispersive X-ray (EDX) analysis, elemental mapping, surface roughness, and water contact angle (WCA). The filtration membrane was further evaluated for its potential to separate pollutants, such as pharmaceutical drugs, and ionic salts, from a contaminated solution. Out of the synthesized variants of MCM-41, the ISM zeolite derivative proved to be the best material for membrane fabrication. The ISM@PS/PET rejected the salts in the following order $MgCl_2 \approx CaCl_2$ (97%)> $MgSO_4$ (90%)>$Na_2SO_4$ (87%). However, in the case of monovalent NaCl, the rejection was 65%. The rejection of the drugs by ISM@PS/PET followed the following order: sulfamethoxazole HCl (93%)>amitriptyline (90%)>loperamide (82%)>caffeine (80%). The flux of the ISM@PS/PET reached 38 $L\ m^{-2}h^{-1}$ (LMH). Compared to conventional methods of mere physical attachment of fillers and additives in the polymeric matrix of the active layers, the utilization of ISM@PS/PET in membrane fabrication (where in situ functionalized MCM-41 was covalently crosslinked to tetramines in the active layer of the membrane) overcomes the challenges faced with the mixing of fillers and additives in the active layer of membranes.

According to an aspect of the present disclosure, a filtration membrane is described. The membrane is fabricated by incorporating an active layer (first layer) on a support (e.g., second layer and third layer). The support may be porous in nature, allowing, in some aspects, liquid to permeate. The support may have pores of 20 to 1500 nm, preferably 20 to 1000 nm, and more preferably 30 to 500 nm in diameter. In some embodiments, the active layer covers at least 50%, preferably 60%, more preferably 80%, and yet more preferably more than 95% of the surface of the support. The first layer includes a triamine-functionalized polysilicate mesoporous material. In some embodiments, the first layer may include mesoporous material, such as mesoporous silica, including ZSM-5, ZSM-11, MCM-48, MCM-41, MCM-22, SUZ-4, and SBA-15 with a wide range of pore geometries (for example, hexagonal, cubic, spheric, cylindrical, rhombic, tetragonal, trigonal, amorphous, and the like) and particle morphologies, such as discs, spheres, rods, cubes, sheets, films, amorphous, and the like. Mesoporous materials contain mesopores that have a pore size having a diameter from about 2 nm to about 50 nm. Mesoporous materials may comprise carbon, activated, silica, alumina, and a combination thereof. Mesoporous material, such as mesoporous oxides, may comprise niobium, tantalum, titanium, zirconium, cerium, tin, the like, and a combination thereof.

The triamine-functionalized polysilicate mesoporous material has a hierarchical structure of Mobil Composition of Matter No. 41 (MCM-41). MCM-41 consists of a regular cylindrical mesopore arrangement forming a one-dimensional pore system. It is characterized by an independently adjustable pore diameter, a sharp pore distribution, a large surface, and a large pore volume. The pores of MCM-41 are larger than the pores of most zeolites, and the pore distribution can easily be adjusted. The mesopores of MCM-41 have a diameter of 2 to 6.5 nanometers. The triamine-functionalized polysilicate mesoporous material of the present disclosure has a porous, granular morphology with an average particle size of 10 to 50 nanometers in diameter. In some embodiments, the first layer may include other mesoporous materials, such as mesoporous silica, including ZSM-5, ZSM-11, MCM-48, MCM-41, MCM-22, SUZ-4, and SBA-15 with a wide range of pore geometries (for example, hexagonal, cubic, spheric, cylindrical, rhombic, tetragonal, trigonal, amorphous, and the like) and particle morphologies, such as discs, spheres, rods, cubes, sheets, films, amorphous, and the like. Mesoporous materials contain mesopores that have a pore size having a diameter from about 2 nm to about 50 nm. Mesoporous materials may comprise carbon, activated, silica, alumina, and a combination thereof. Mesoporous material, such as mesoporous oxides, may comprise niobium, tantalum, titanium, zirconium, cerium, tin, the like, and a combination thereof.

The triamine-functionalized polysilicate mesoporous material includes a polysilicate mesoporous material and one or more silicon-containing triamines. The polysilicate mesoporous material includes repeating units of silicates. Silicates are compounds of a group of polyatomic anions consisting of silicon and oxygen. Examples of silicates include, but are not limited to, orthosilicate, metasilicate, and pyrosilicate. In an embodiment of the present disclosure, the polysilicate is in the form of tetrahedral $SiO_4^{4-}$ units.

The silicon-containing triamine includes a silicon atom and a triamine. Examples of silicon-containing triamines include $N^1$-(3-trimethoxysilylpropyl)diethylenetriamine, 2-N-silyl-1,3,5-triazine-2,4,6-triamine, 2-N'-silyl-5-trimethoxysilylpentane-1,2,2-triamine. In a preferred embodiment, the silicon-containing triamine is an $N^1$-(3-trimethoxysilylpropyl)diethyltriamine. The silicon-containing triamine may be bonded directly with a silicate group of the polysilicate to form a triamine-functionalized polysilicate backbone. The molar ratio of silicon-containing triamine and the silicate group of the polysilicate of the triamine-functionalized polysilicate backbone may be from 1:3 to 1:20, preferably 1:3 to 1:15, more preferably 1:3 to 1:10, and yet more preferably 1:4 to 1:8. The distribution of silicon-containing triamine in the triamine-functionalized polysilicate backbone may be one silicon-containing triamine unit every three or more silicate group. The silicon-containing triamine may be integrated into one or more silicate groups in a backbone structure. The silicon-containing triamine may be branched from one or more silicate groups in a branched backbone structure. In an embodiment, one silicon-containing triamine may be repeated after at least two sequential silicate groups of the triamine-functionalized polysilicate backbone. In some embodiments, one silicon-containing triamine may be repeated after at least three sequential silicate groups of the triamine-functionalized polysilicate backbone. In some embodiments, silicate groups may be a single silicate group followed by a single silicon-containing triamine unit, in which a superset of the silicate groups followed by the silicon-containing triamine unit may repeat. In some embodiments, silicate groups may be at least one repeating unit and up to ten sequentially repeating units followed by a single silicon-containing triamine unit, in which a superset of the silicate groups followed by the silicon-containing triamine unit may repeat.

The silicon atom of the silicon-containing triamine is bonded to one or more silicate groups in the polysilicate mesoporous material to form the triamine-functionalized polysilicate backbone. The nature of the interaction between the silicon atom of the silicon-containing triamine to the silicate group in the triamine-functionalized polysilicate backbone is a covalent bond, e.g., a (triamine)Si—O—Si (silicate) bond. In an embodiment, the synthesis of the triamine-functionalized polysilicate mesoporous material has a molar ratio of silicate (for example, TEOS) to $N^1$-(3-trimethoxysilylpropyl)diethyltriamine of 1:1 to 20:1, preferably 1:1 to 10:1, more preferably 3:1 to 7:1, and yet more preferably about 5:1 by weight. The triamine-functionalized polysilicate backbone of the triamine-functionalized polysilicate mesoporous material may repeat to produce a polymeric material of suitable dimensions. In some embodiments, the nature of the linkage between an orthosilicate group and the silicon atom, preferably a terminal silicon atom, of the silicon-containing triamine is a covalently bonded Si—O—Si—O—Si linkage, as an integrated part of an orthosilicate network. In some embodiments, the orthosilicate group is covalently bonded to a terminal silicon atom of the silicon-containing triamine through an Si—O—Si—O—Si linkage as an endcap of the orthosilicate network. In said embodiments, the silicon-containing triamine is the $N^1$-(3-trimethoxysilylpropyl)diethyltriamine. The triamine-functionalized polysilicate mesoporous material has a porous, granular morphology with an average particle size of 10 to 50 nanometers in diameter.

The first layer further includes reacted units of a diacyl compound and a tetramine compound. A diacyl chloride compound may be used as a precursor for the reacted units of the diacyl compound in the first layer. The diacyl chloride compound may comprise a linear or branched aliphatic diacyl chloride with 0-50 carbon atoms, preferably 1-20 carbon atoms, and more preferably 3-10 carbon atoms between two acyl chloride groups in the diacyl chloride compound. The diacyl chloride compound may comprise one or more aromatic ring, substituted or unsubstituted, with two acyl chloride groups. In a preferred embodiment, the diacyl chloride compound is an aromatic ring substituted with two acyl chloride groups. In some embodiments, the diacyl chloride compound is terephthaloyl chloride (TPC). In some embodiments, the tetramine compound is a linear or branched aliphatic amine with 2-50 carbon atoms, preferably 2-20 carbon atoms, and more preferably 5-10 carbon atoms and four amine groups. In a preferred embodiment, the tetramine is N,N'-bis(3-aminopropyl)ethylenediamine or N,N-bis(2-aminoethyl)-1,3-propanediamine. In a preferred embodiment, the tetramine is N,N'-bis(3-aminopropyl)ethylenediamine.

The silicon-containing triamine and the tetramine(s) are covalently crosslinked with terephthaloyl chloride (TPC) via interfacial polymerization (IP) to form a polyamide. Interfacial polymerization is a step-growth polymerization in which the polymerization occurs at the interface between two immiscible phases (generally two liquids), and the resulting polymer is constrained to the interface, comprising the interfacial layer. Variations of interfacial polymerization include, but are not limited to, polymer topologies of ultrathin films, nanocapsules, nanofibers, and the like. Interfacial polymerization may be used to prepare polyamides, polyanilines, polyimides, polyurethanes, polyureas, polypyrroles, polyesters, polycarbonates, and the like. During the interfacial polymerization process of the present disclosure, at least one primary amine of the silicon-containing triamine and a secondary amine of the silicon-containing triamine, and at least one of the primary amine groups of the tetramine and a secondary amine group of the tetramine are covalently crosslinked with terephthaloyl chloride to form a polyamide. In an embodiment, one or more primary amines of the silicon-containing triamine may be covalently crosslinked with terephthaloyl chloride to one or more primary amines of the tetramine to form one or more polyamide linkages. In some embodiments, one or more primary amines of the silicon-containing triamine may be covalently crosslinked with terephthaloyl chloride to one or more secondary amines of the tetramine to form one or more polyamide linkages. In an embodiment, one or more secondary amines of the silicon-containing triamine may be covalently crosslinked with terephthaloyl chloride to one or more primary amines of the tetramine to form one or more polyamide linkages. In some embodiments, one or more secondary amines of the silicon-containing triamine may be covalently crosslinked with terephthaloyl chloride to one or more secondary amines of the tetramine to form one or more polyamide linkages. In an embodiment, one or more primary amines of the tetramine may be covalently crosslinked with terephthaloyl chloride to one or more primary amines of the tetramine to form one or more polyamide linkages. In an embodiment, one or more primary amines of the tetramine may be covalently crosslinked with terephthaloyl chloride to one or more secondary amines of the tetramine to form one or more polyamide linkages. In an embodiment, one or more secondary amines of the tetramine may be covalently crosslinked with terephthaloyl chloride to one or more secondary amines of the tetramine to form one or more polyamide linkages. In some embodiments, the first tetramine and the second tetramine(s) are covalently crosslinked with terephthaloyl chloride via a primary and/or a secondary amine of the first tetramine and a primary and/or a secondary amine of the second tetramine. The first tetramine group and the second tetramine group may be the same or different. In said embodiment, the first tetramine and the second tetramine is the N,N'-bis(3-aminopropyl)ethylenediamine. The current disclosure may include one or more and any combination of the above disclosed polyamide linkages, as well as polyamide linkages not specifically disclosed herein.

The reaction between triamine-functionalized polysilicate mesoporous material, tetramine, and TPC forms an active layer with crosslinking of triamine-functionalized polysilicate mesoporous material in the first layer. During the complexation process, the triamine-functionalized polysilicate backbone of the triamine-functionalized polysilicate mesoporous material is covalently bonded to one or more tetramines; particularly, an amine of the tetramine is coordinated to at least one amine in the triamine-functionalized polysilicate backbone. In a preferred embodiment, one or more carbon atoms of the one or more acyl groups of the diacyl compound is covalently bonded to one or more nitrogen atoms of the tetramines and the silicon-containing triamines. In some embodiments, one or more carbon atoms of the one or more acyl groups of the diacyl compound may be covalently bonded to a primary amine of the tetramine. In some embodiments, one or more carbon atoms of the one or more acyl groups of the diacyl compound may be covalently bonded to a secondary amine of the tetramine. The tetramine may be covalently bonded to one or more carbon atoms of the one or more acyl groups of the diacyl compound in the active layer. In some embodiments, one or more carbon atoms of the one or more acyl groups of the diacyl compound may be covalently bonded to a primary amine of the silicon-containing triamine. In some embodiments, one or more diacyl compounds may be covalently bonded to one or more tetramines and one or more silicon-containing triamines in the active layer. The distribution and thickness of the active layer is variable and dependent on the choice of the method, reaction conditions, and the concentration of the tetramine and the TPC. In an embodiment, the synthesis of the active layer of the filtration membrane has a ratio of the triamine-functionalized polysilicate mesoporous material to N,N'-bis(3-aminopropyl)ethylenediamine of 1:1 to 1:100, preferably 1:1 to 1:50, more preferably 1:5 to 1:50, and yet more preferably 1:10 to 1:40 by weight. In an embodiment, the synthesis of the active layer of the filtration membrane has a ratio of the triamine-functionalized polysilicate mesoporous material to terephthaloyl chloride of 1:1 to 1:50, preferably 1:1 to 1:40, more preferably 1:1 to 1:20, and yet more preferably 1:1 to 1:10 by weight. The active layer may contain a molar ratio of the silicon-containing triamine of the triamine-functionalized polysilicate mesoporous material to the diacyl compound of 1:1 to 1:20, preferably 1:1 to 1:10, and more preferably 1:2 to 1:7. The active layer may have a thickness of 50 to 5000 nm, preferably 100 to 5000 nm, and yet more preferably 100 to 2000 nm.

The first layer, including the active layer, has a uniform, globular morphology with an average particle size of 10 to 80 nanometers in diameter. Elemental analysis reveals the presence of carbon in the first layer in an amount of 40 to 70 percent, oxygen in an amount of 25 to 40 percent, silicon in an amount of 5 to 20 percent, and nitrogen in an amount of 2 to 8 percent based on a total elemental composition of the first layer.

The triamine-functionalized polysilicate mesoporous material is preferably synthesized by a base-catalyzed reaction between a silicon-containing triamine and a silica source in the presence of a surfactant. In a preferred embodiment, the silicon-containing triamine is an $N^1$-(3-trimethoxysilylpropyl)diethyltriamine (NTSDETA). Examples of silica sources include fused silica, colloidal silica, tetraalkyl silicates, tetraethyl orthosilicate (TEOS), tetramethyl orthosilicate (TMOS), other tetraalkoxysilanes, and the like. In some embodiments, the silica source is an alkoxysilane compound. As used herein, the term 'alkoxysilane compound' refers to the silane compound, which includes alkoxy radicals. The alkoxysilane compound is at least one selected group of trimethoxy(octadecyl)silane, from the consisting octadecyltrichlorosilane, and octylidimethylchlorosilane. In some embodiments, the alkoxysilane compound may include $Si(OMe)_4$, $MeSi(OMe)_3$, $MeSi(OCH_2Ch_2OMe)_3$, $ViSi(OMe)_3$, $PhSi(OMe)_3$, $PhSi(OCH_2Ch_2OMe)_3$, and the like. In a preferred embodiment, TEOS was used as the silica source. In an embodiment, the surfactant is cetyltrimethylammonium bromide (CTAB), hexadecylaminhad (HDA), sodium dodecyl sulfate (SDS), and the like. In a preferred embodiment, the surfactant is CTAB. The base may be NaOH, KOH, LiOH, RbOH, CsOH, $Mg(OH)_2$, $Ca(OH)_2$, $Sr(OH)_2$, $Ba(OH)_2$, or combinations thereof. In a preferred embodiment, the base is NaOH. The reaction is carried out at a temperature range of 50-100° C., preferably 60-90° C., more preferably at 80° C., for a period of 5-10 hours, preferably 6-8 hours, more preferably for 8 hours, under stirring, causing the incorporation of silicon-containing triamine with the silica source, to yield triamine-functionalized polysilicate mesoporous material. The triamine-functionalized polysilicate mesoporous material may be in a layer. The layer of triamine-functionalized polysilicate mesoporous material may have a thickness of 50 to 2000 nm, preferably 50 to 1000 nm, more preferably 50 to 500 nm, and yet more preferably 50 to 200 nm. The triamine-functionalized polysilicate mesoporous material may be in more than one layer. The triamine-functionalized polysilicate mesoporous material may be in multiple layers. The membrane has triamine-functionalized polysilicate mesoporous material in the amount of about 0.1% by weight. The triamine-functionalized polysilicate mesoporous material may be functionalized with the silicon-containing triamine during an in situ procedure of the synthesis of the hierarchical structure of MCM-41 and a post-synthesis procedure of the synthesis of the hierarchical structure of MCM-41.

The membrane further includes a second and third layer, forming the support. In some embodiments, the support includes pores. The support may have pores of 20 to 1500 nm, preferably 20 to 1000 nm, and more preferably 30 to 500 nm in diameter. Generally, the support should possess good mechanical and thermal properties. Also, the support should demonstrate high resistance to chemicals such as aromatic hydrocarbons, ketones, ethers, and esters. The support is an aggregate material comprising a polymer component configured to strengthen the membrane structure. In some embodiments, the support may be formed of polymeric materials such as polysulfone (PS), polyethersulfone (PES), polyethylene terephthalate (PET), or a combination thereof. Suitable polymers to be included in support layers comprise, for example, polyvinylidene fluoride (PVDF), polytetrafluoroethylene (PTFE), polyacrylonitrile (PAN), poly(methyl methacrylate) (PMMA), poly(methacrylic acid) (PMAA), poly(acrylic acid) (PAA), poly(vinyl methyl ketone), poly(ether sulfone) (PSF), polyacrylonitrile (PAN), polypropylene (PP), polyimide (PI), and poly(arylene ether nitrile ketone) (PPENK), which can used alone or in combination with the polysulfone, polyethersulfone, polyethylene terephthalate.

In some embodiments, the second layer includes PS. In some embodiments, the third layer includes PET. To prepare the support (PS/PET), the PS and the PET were mixed in various weight ratios to obtain the support with desired chemical, mechanical, and thermal properties. Although the description herein refers to the use of PS/PET support, it may be understood by a person skilled in the art that other polymeric supports may be used as well, albeit with a few variations, as may be evident to a person skilled in the art. The support may be prepared by any of the conventional methods known in the art—for example, the phase inversion method or the electrostatic spinning method. In a preferred embodiment, the PS/PET support is prepared by the phase inversion method. Phase inversion is a process in which membranes are fabricated. Phase inversion is performed by removing solvent from a liquid polymer solution, leaving a porous, solid membrane. Phase inversion may be carried out through reducing the temperature of the solution, immersing the polymer solution into an anti-solvent, exposing the polymer solution to a vapor of anti-solvent, evaporating the solvent in atmospheric air, evaporating the solvent at high temperature, and a combination thereof. A mean pore diameter and pore diameter distribution may be varied and dependent on a rate at which phase inversion occurs.

To fabricate the membrane, an amount of triamine-functionalized polysilicate mesoporous material was dispersed in an aqueous solution of multifunctional, linear aliphatic amine N,N'-bis(3-aminopropyl)ethylenediamine (tetramine). The tetramine was in an amount from 1 to 10% (wt/v), preferably 1 to 5% (wt/v), more preferably 1 to 3% (wt/v), and yet more preferably about 2% (wt/v). A strong base, preferably triethylamine, was added to the aqueous solution. The aqueous solution was sonicated for 1 to 60 minutes, preferably 5 to 45 minutes, more preferably 10 to 30 minutes, and yet more preferably about 15 minutes. In a preferred embodiment, the aqueous solution was probe-sonicated. A homogeneous aqueous amine solution was formed after sonication. Then, the interfacial polymerization (IP) was carried out on the support (prepared by phase inversion), PS/PET, using a linear crosslinker, TPC, dissolved in n-hexane. The linear crosslinker TPC was dissolved in n-hexane in an amount of 1 to 10% (wt/v), preferably 1 to 5% (wt/v), more preferably 1 to 3% (wt/v), and yet more preferably about 2% (wt/v). The PS/PET support was attached to a glass surface and dipped into the aqueous amine solution for 1 to 30 minutes, preferably 5 to 15 minutes, and more preferably about 10 minutes. In a preferred embodiment, the glass surface is flat. In a preferred embodiment, the glass surface is moved in the aqueous amine solution in a see-saw motion. The glass surface was then dipped in the solution of TPC for about one minute. The IP reaction led to the formation of triamine-functionalized polysilicate mesoporous material of the membrane. The membrane was dried at a temperature of 50 to 100° C., preferably 70 to 90° C., and more preferably about 80° C. for a time of 20 to 200 minutes, preferably 40 to 100 minutes, and more preferably about 60 minutes. A method for making the membrane is described. Referring to FIG. 1, a schematic flow diagram of a method of making the membrane is illustrated. The order in which the method 50 is described is not intended to be construed as a limitation, and any number of the described method steps may be combined in any order to implement the method 50. Additionally, individual steps may be removed or skipped from the method 50 without departing from the spirit and scope of the present disclosure.

At step 52, the method 50 includes mixing the triamine-functionalized polysilicate mesoporous material, N,N'-bis(3-aminopropyl)ethylenediamine, triethylamine, and water to form an amine solution. Optionally, other linear, aliphatic, tetramines may be used as well instead of N,N'-bis(3-aminopropyl)ethylenediamine, The wt/v ratio of the N,N'-bis(3-aminopropyl)ethylenediamine to triethylamine is in a range of 1:1 to 1:5, preferably 1:2 to 1:4, more preferably 1:2. The amine solution includes M zeolite or ISM zeolite or PSM zeolite, depending on the stage of functionalization of the triamine-functionalized polysilicate mesoporous material. In some embodiments, the triamine-functionalized polysilicate mesoporous material may be functionalized with the silicon-containing triamine during an in situ procedure of the synthesis of the hierarchical structure of MCM-41 (to form ISM zeolite) or during a post-synthesis procedure of the synthesis of the hierarchical structure of MCM-41 (to form the PSM zeolite).

At step 54, the method 50 includes sonicating the amine solution. The amine solution was sonicated for homogenization. The sonication may be carried out in a ultrasonic bath or a probe sonicator. In a preferred embodiment, the amine solution was probe sonicated for 10-30 minutes, preferably 12-20 minutes, more preferably for about 15 minutes, to form a homogenous solution.

At step 56, the method 50 includes dissolving terephthaloyl chloride in hexane to form a crosslinker solution. The TPC serves as a crosslinker, and, when dissolved in n-hexane forms a cross-linking solution. The concentration of TPC in the hexane is in a range of 0.1-1, preferably 0.2-0.5, and more preferably about 0.2 wt/v %.

At step 58, the method 50 includes casting the polysulfone on the polyester terephthalate with wet phase inversion to form a support. Optionally, other polymers such as, poly (vinylidene) fluoride, poly(tetrafluoroethylene), poly(acrylonitrile), poly(methyl methacrylate), poly(methacrylic acid), poly(acrylic acid), poly(vinyl methyl ketone), and poly(ethylene terephthalate), polysulfone, polyethersulfone, poly(ether sulfone), polypropylene, polyimide, and poly (arylene ether nitrile ketone), alone or in combination, may be used as well to form the support.

At step 60, the method 50 includes attaching the support to a glass surface to form a base foundation. The support is further reinforced on a glass surface to increase its tensile strength. To facilitate the attachment of the support onto the glass surface, the glass surface may optionally be surface activated by any of the methods conventionally known in the art.

At step 62, the method 50 includes dipping the base foundation in the amine solution to form a complex. The base foundation was dipped in the amine solution for a period of 5-30 minutes, preferably 10-20 minutes, more preferably about 10 minutes, with intermittent/constant shaking, to form a complex.

At step 64, the method 50 includes dipping the complex in the crosslinker solution to form the membrane. An IP reaction occurs, leading to the formation of a covalently decorated triamine-functionalized MCM-41 on the active polyamide layer of the membrane. One of the factors that affect the performance of the membrane is the duration to which the complex is exposed to the crosslinker. In an embodiment, the complex may be dipped in the cross-linker solution for 1-5 minutes, preferably 1-3 minutes, more preferably about 1 minute to form the membrane. The excess hexane may then be washed; the membrane is further dried to a temperature range of 70-100° C. to evaporate the solvents (n-hexane). The drying may be carried out in an oven for a period of 1-3 hours, preferably 60-90 minutes, more preferably 60 minutes.

Surface roughness is yet another parameter determining the performance of the membrane. Literature reveals that rougher surfaces tend to foul because of the accumulation of foulants in the valleys, which reduces the permeate quality and flow rate. The membrane of the present disclosure has an average surface roughness of 15 to 45 nm, which is comparable to commercial membranes. The success of the fabrication process was determined based on the determining the water contact angle (WCA). Generally, if the WCA is smaller than 90°, the membrane is considered hydrophilic; if the WCA is larger than 90°, the membrane is considered hydrophobic. The WCA of the membrane of the present disclosure is in a range of 55° to 95°. The permeate rate of flux of 30 to 60 L m$^{-2}$h$^{-1}$ at a feed pressure of 25 bar.

Another aspect of the present disclosure describes a method of filtration with the filtration membrane of the present disclosure. The method includes wetting the filtration membrane with water. Wetting the membrane is a first step in preparing the filtration membrane. Wetting the filtration membrane pores eliminates dry pathways where contaminants, like particles, gels, or bubbles, could pass through, resulting in poor separation performance. Next, the method includes contacting the filtration membrane with a contaminated solution. After contacting the water composition with the filtration membrane, a permeate passes through the membrane. Contaminated solution refers to a solution containing unwanted substances or impurities, or pollutants, or otherwise refers to a solution that affects the physical body, workplace, environment, or any experimental procedure. The contamination solution includes water and a pollutant. The pollutant may be a pharmaceutically active compound, dye, ionic salts, or a combination thereof.

In some embodiments, the pollutant is a pharmaceutically active compound. Pharmaceutically active compounds are a class of emerging environmental contaminants widely being used in human and veterinary medicine. The primary source of release of these substances and their metabolites into the environment is represented by domestic disposal and hospital sewage discharge. The pharmaceuticals may include organic compounds and salts of the organic compounds, preferably organic compounds having one or more aryl groups. The pharmaceuticals may include functional groups such as alkanes, alkenes, alkynes, aromatic rings, alcohols, esters, ethers, ketones, aldehydes, carboxylic acids, amines, amides, alkyl halides, thiols, the like, and any combination thereof. The pharmaceuticals may have a molecular weight of 100 to 1000 g/mol, preferably 100 to 700 g/mol, and more preferably 150 to 550 g/mol. The pharmaceuticals may have a rigid molecular structure and a flexible molecular structure. Suitable examples of the pharmaceutically active compounds include cetaminophen, metoprolol, caffeine, antipyrine, sulfamethoxazole, flumequine, ketorolac, atrazine, isoproturon, 2-hydroxybiphenyl, diclofenac, amitriptyline, and loperamide. Certain other examples include, analgesics (for example, propoxyphene); anticonvulsants (for example: phenytoin); anti-depressants (for example, fluoxetine (Prozac), sertraline (Zoloft), amitriptyline, protriptyline, trimipramine maleate, nortriptyline, desipramine, imipramine, doxepin, nordoxepin, paroxetine); anti-inflammatory (for example, methyprednisolone, prednisone); hormones (for example, equilin, 17β-estradiol, estrone, 17α-ethynyl estradiol, medroxyprogesterone, megestrol acetate, mestranol, progesterone, norethindrone, norethynodrel, norgestrel, cholesterol); antibiotics (for example, norfloxacin, lincomycin, oxytetracycline HCl, ciprofloxacin, ofloxacin, trimethoprim, penicillin G benzathine salt, sulfamethoxazole, penicillin V potassium salt, tylosin tartrate). In a preferred embodiment, the pollutants are pharmaceutically active compounds selected from caffeine, sulfamethoxazole, amitriptyline, and loperamide, or a mixture thereof. Contacting the filtration membrane with the contaminated solution results in a rejection percentage of 35 to 95 percent based on an initial weight of the pharmaceutically active compound at a pressure of 15 bar.

In some embodiments, the pollutant is a dye. Suitable examples of dyes include, alkaline methylene blue, methylene blue, tetrazine, acid orange, phenolic phenol, bisphenol, 2,4 dichlorophenol, Congo red, toluene, chromium ions, bromate ions, eosin yellow, etc. In some embodiments, the pollutant is an ionic salt. The salts may include inorganic ions and organic ions. The salts may include monatomic ions and polyatomic ions. The salts may include positively changed cations with charges of +1, +2, +3, +4, +5, +6, and +7. The salts may include negatively charged anions with charges of −1, −2, −3, and −4. Suitable examples of ionic salt include $MgCl_2$, $CaCl_2$, $MgSO_4$, $Na_2SO_4$, and NaCl. Contacting the filtration membrane with the contaminated solution results in a rejection percentage of 50 to 97 percent based on an initial weight of the ionic salt at a pressure of 15 bar.

The filtration membrane of the present disclosure is adapted for use selected from a group consisting of oil and water separation, water treatment, desalination, and pharmaceutical filtration. The membrane may be effective in separating oils, such as toluene, cyclohexane, n-hexane, dichloromethane, waste oil, or a mixture thereof when adapted for use in oil and water separation.

EXAMPLES

The following examples demonstrate the filtration membrane as described herein. The examples are provided solely for illustration and are not to be construed as limitations of the present disclosure, as many variations thereof are possible without departing from the spirit and scope of the present disclosure.

Example 1: Materials

Tetraethyl orthosilicate (TEOS), cetyltrimethylammonium bromide (CTAB), sodium hydroxide (NaOH), terephthaloyl chloride (TPC), polysulfone, triethylamine (TEA), and N,N'-bis(3-aminopropyl)ethylenediamine (BAPEDA) were purchased from Sigma Aldrich, USA. The ethanol and hydrochloric acid (HCl) were purchased from Merck, Germany. $N^1$-(3-trimethoxysilylpropyl) diethylenetriamine (NTSDETA) was purchased from Gelest, USA. For the filtration test, different salts ($MgCl_2$, $CaCl_2$, $MgSO_4$, $Na_2SO_4$, NaCl) and pharmaceutically active compounds (caffeine, sulfamethoxazole, amitriptyline, loperamide) were also bought from Sigma.

Example 2: Characterization

The attenuated total reflectance Fourier-transform infrared (ATR-FTIR) spectroscopy was carried out using Thermo, Smart iTR NICOLET iS10 (manufactured by ThermoFisher Scientific, 168 Third Avenue. Waltham, MA USA 02451) to evaluate the vibrations of different functional groups in the material, active layer, and membranes. Other membrane-related features like surface morphology and hydrophilicity were tested using a scanning electron microscope (SEM) (JEOLJSM6610LV, 3-1-2 Musashino, Akishima, Tokyo 196-8558, Japan), atomic force microscope (AFM Aglient 550, manufactured by Agilent, 5301 Stevens Creek Blvd. Santa Clara, CA 95051), and water contact angle (WCA) (KRUSS DSA25, manufactured by KraussMaffei Technologies GmbH. Krauss-Maffei-Strasse 1. 85599 Parsdorf, Germany), respectively. The feed and permeate solution was tested using a conductivity meter (Ultrameter II, Hanna, 270 George Washington Hwy; Ann Arbor, MI. United States) for salts and a JASCO V-750 (manufactured by JASCO, 2967-5 Ishikawa-machi Hachioji-shi Tokyo, Japan) UV-Vis spectrophotometer for pharmaceutically active compounds.

Example 3: Synthesis of MCM-41 and Functionalized-MCM-41

The synthesis of mesoporous MCM-41 was carried out (Dinh Du, et. al., 2019. Aminopropyl Functionalised MCM-41: Synthesis and Application for Adsorption of Pb(II) and Cd(II). Adv. Mater. Sci. Eng. 1-15, incorporated herein by reference in its entirety) by stirring a template (CTAB) (0.25 g) in 240 mL of DI water and 3.5 mL of 2 M NaOH solution at 80° C. for 30 minutes. Subsequently, 4.7 g of TEOS was added to initiate the precipitation. The stirring was continued for an additional 90 minutes. Finally, the synthesized crude product was centrifuged to remove the CTAB template, washed multiple times with ethanol, and calcined at 500° C. for 4 hours. The MCM-41 product was denoted as "M zeolite."

Figure 2A:
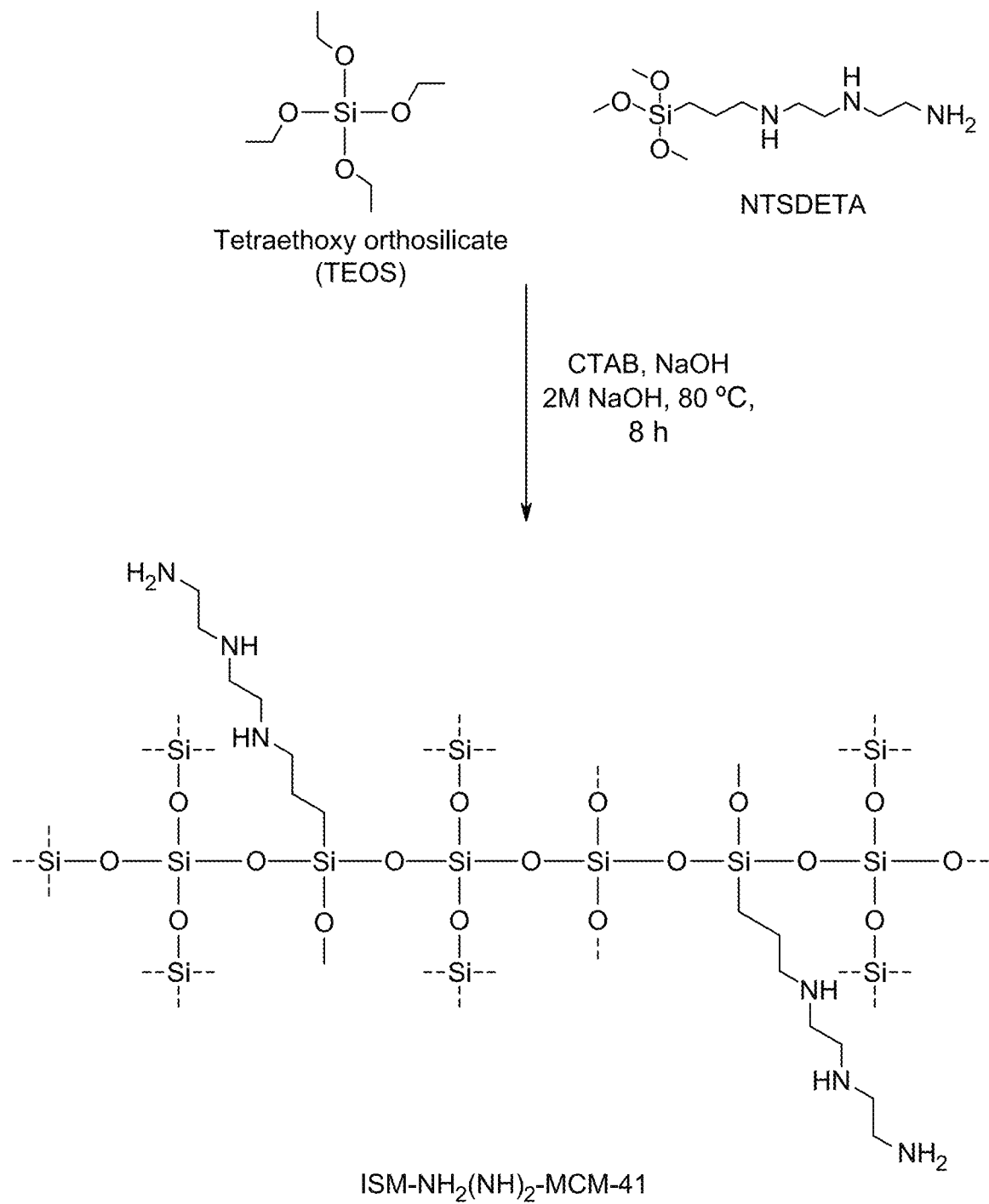
FIG. 2A is a schematic illustration depicting a synthetic route for preparation of in situ modified (ISM) MCM-41 zeolite, according to an aspect of the present disclosure.

The triamine functionalization of MCM-41 was done using two strategies, in situ and post-MCM-41 synthesis. First, an in situ approach was utilized by stirring 0.25 g of CTAB and 3.5 mL of 2 M NaOH in 240 mL of distilled water at 80° C. for 30 minutes. Later, TEOS (4.7 g) and NTSDETA (molar ratio TEOS:NTSDETA=5) were added, respectively, with a time difference of 30 minutes. Then, the solution was kept stirred for 90 minutes. Finally, the organic template was removed by centrifugation/decanting and washing multiple times with HCl/ethanol mixture (1:100, v/v). This in situ functionalized MCM-41 material was denoted as "ISM zeolite" (FIG. 2A).

Figure 2B:
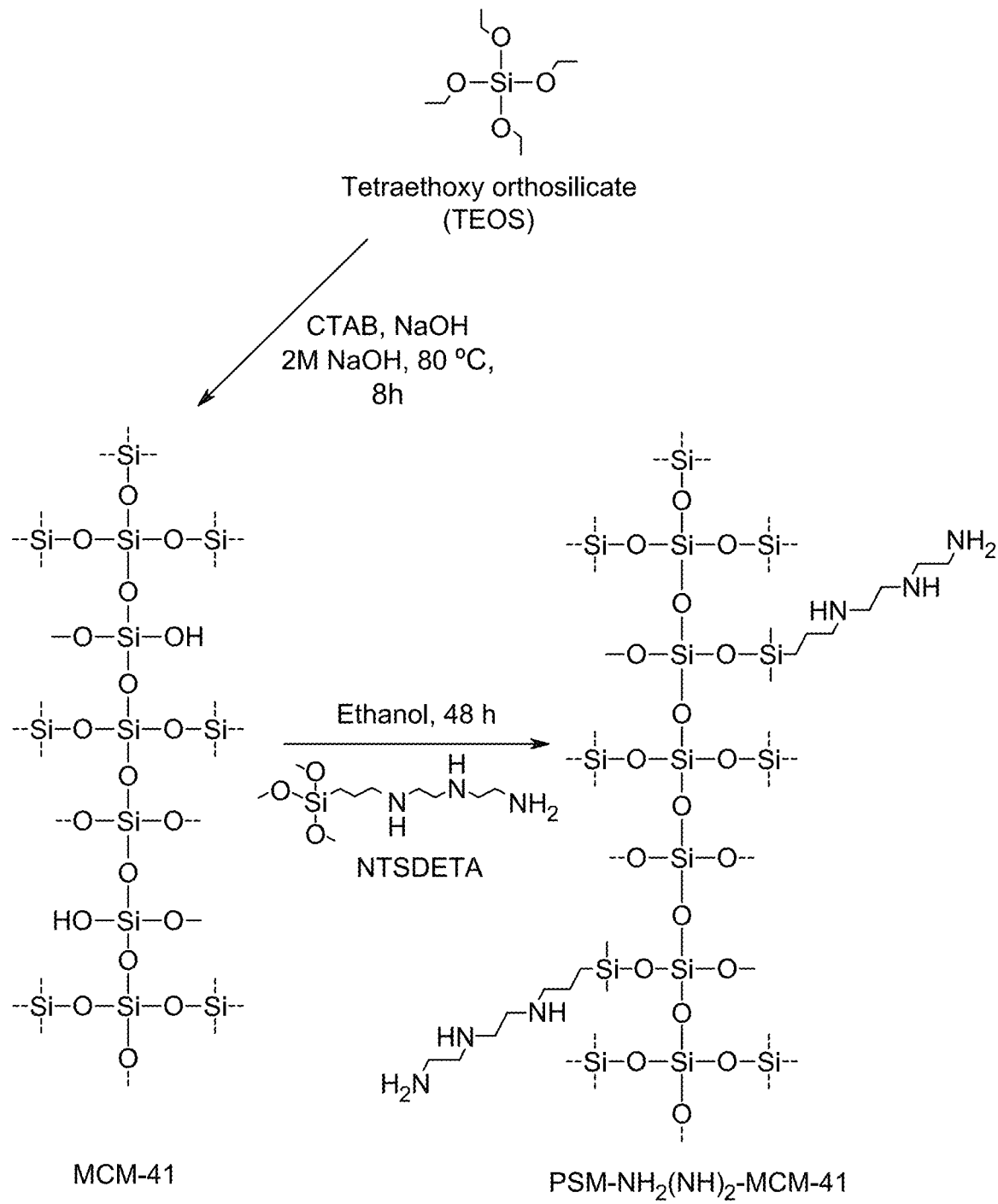
FIG. 2B is a schematic illustration depicting a synthetic route for preparation of post-synthesis modified (PSM) MCM-41 zeolite, according to an aspect of the present disclosure.

For post-synthesis triamine functionalization of MCM-41, the material "MCM-41" was first synthesized using the procedure described above. Later, 1.0 g MCM-41 was added to 50 mL of ethanol and probe sonicated for 10 minutes for better dispersion. To this solution, NTSDETA (molar ratio TEOS:NTSDETA=5) and 2 drops of water were added and kept for 12 hours stirring at 50° C. Finally, the product was centrifuged multiple times, washed using ethanol and water, respectively, and dried at 80° C. for 4 hours. This post-synthetically functionalized material was denoted as "PSM zeolite" (FIG. 2B).

Example 4: Membrane Fabrication

Three different membranes typologies were designed based on the material used and denoted as "M@PS/PET" (0.1% M zeolite), "ISM@PS/PET" (0.1% ISM zeolite), and "PSM@PS/PET" (0.1% PSM zeolite). For interfacial polymerization, three amine solutions in DI water were prepared by adding the 0.1% (wt/v) MCM-41 materials, 2% (wt/v) BAPEDA, and 4% (wt/v) TEA. The above mixture was probe-sonicated for 15 minutes to homogenize the solutions. Finally, the crosslinker solution was prepared by dissolving 0.2% (wt/v) TPC in n-hexane.

Figure 3:
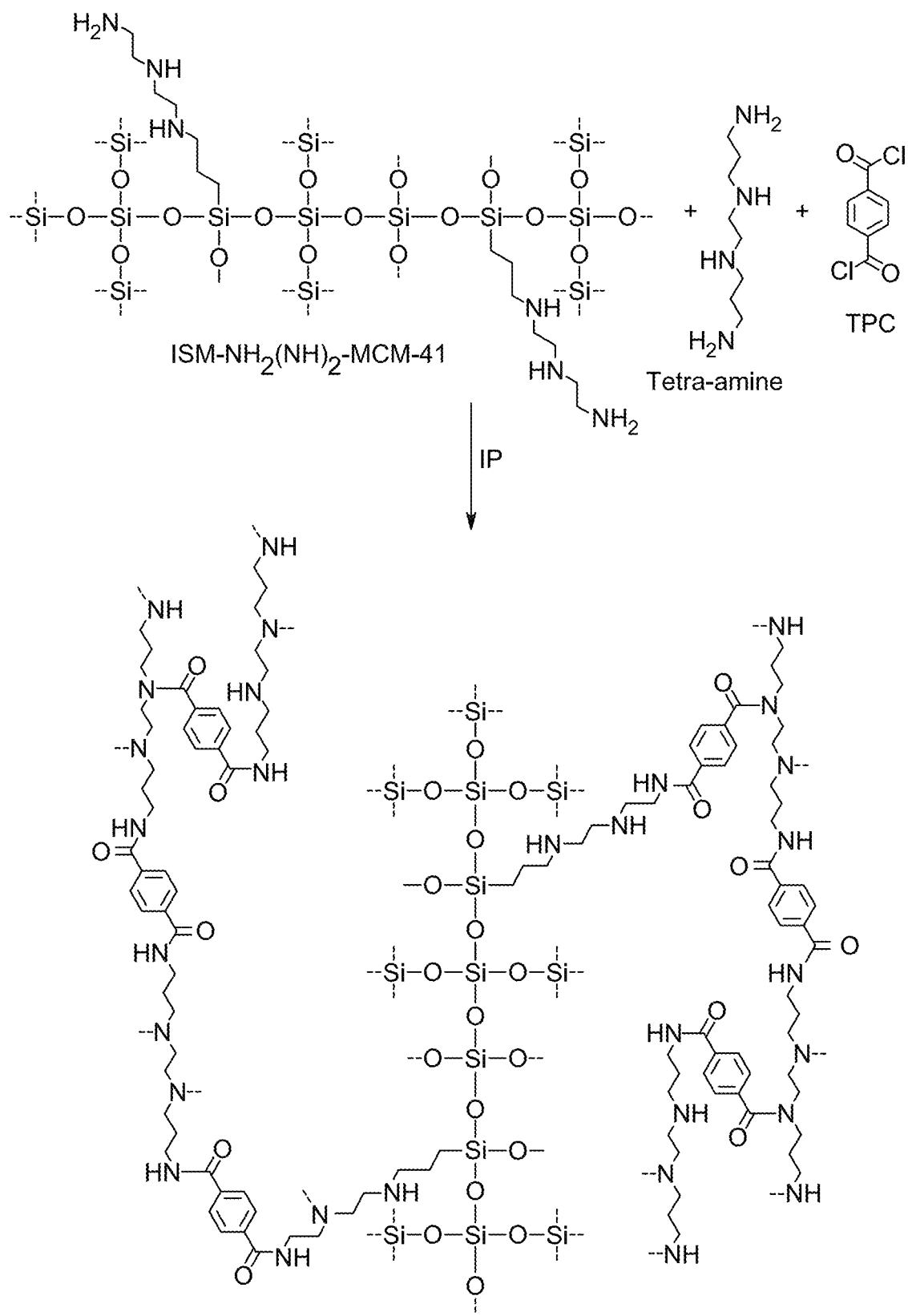
FIG. 3 is a schematic illustration depicting reaction intermediates and conditions of interfacial polymerization (IP) along with a possible structure of an active layer of a membrane, according to an aspect of the present disclosure.

The polysulfone layer was cast on nonwoven polyester terephthalate (PET) using wet phase inversion methodology. The support was attached to the flat glass surface and dipped into the amine solution with as-synthesized material (M zeolite, ISM zeolite, or PSM zeolite) for 10 minutes with continuous see-saw-styled shaking. Next, the membrane was removed, and the excess amine solution was swept using a rubber roller. Later, the membrane was dipped into crosslinker solution (0.2% (wt/v) TPC in hexane) for 1 minute, taken out, washed with excess n-hexane, and kept inside the oven at 80° C. for 1 hours. Finally, the membranes were soaked in DI water before the filtration test. FIG. 3 shows the reaction conditions and possible structure of the resultant active layer.

Figure 4B:
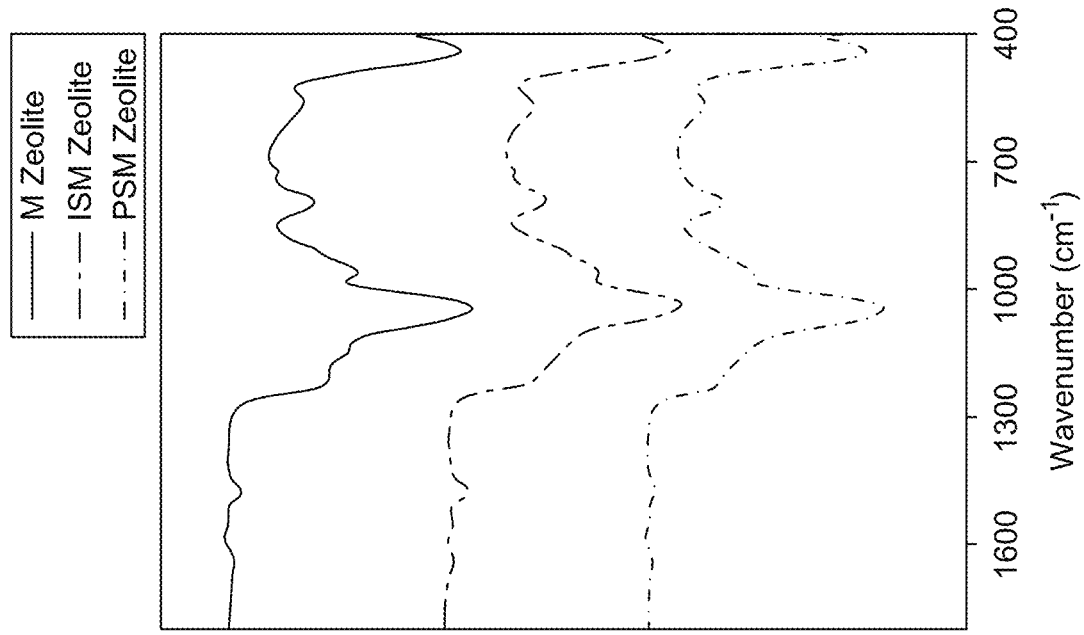
FIG. 4B shows a fingerprint region of the ATR-FTIR spectra of FIG. 4A, according to an aspect of the present disclosure.
Figure 4A:
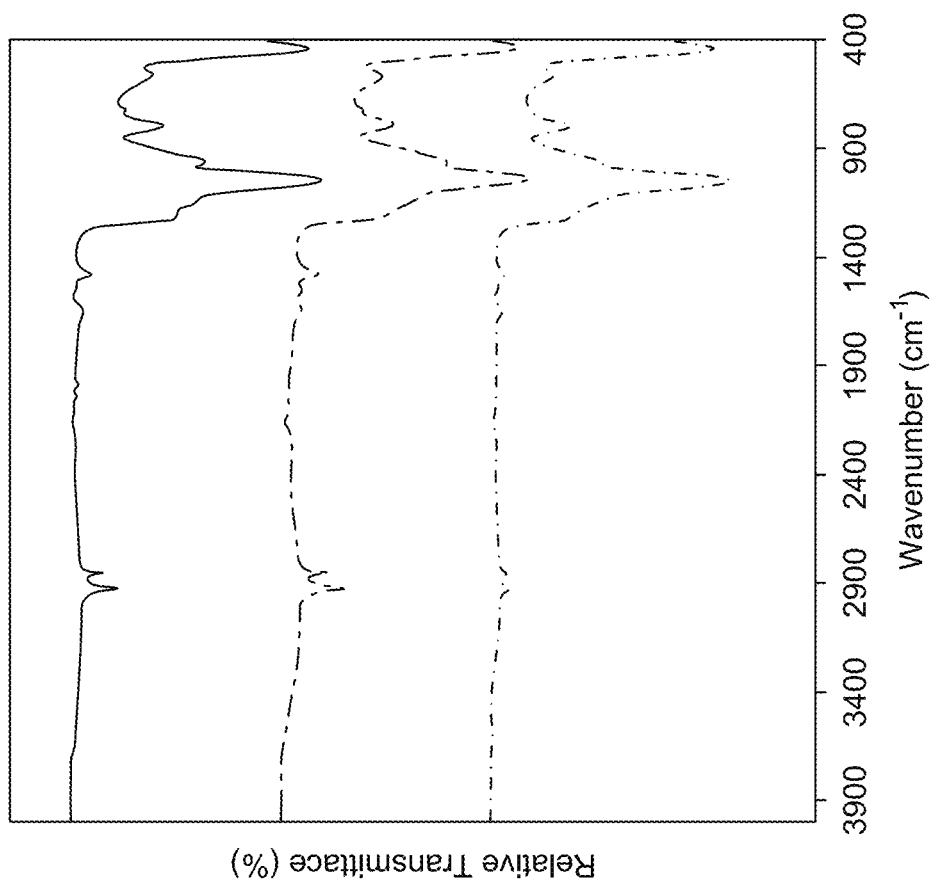
FIG. 4A shows an Attenuated Total Reflectance—Fourier Transform Infrared (ATR-FTIR) of MCM-41 (M) zeolite, ISM zeolite, and PSM zeolite, according to an aspect of the present disclosure.

The functional groups were identified by ATR-FTIR of all the synthesized materials, including M zeolite, ISM zeolite, and PSM zeolite (FIGS. 4A and 4B). M zeolite consists of characteristic Si—O—Si and residual ethyl groups (—$CH_2CH_3$), as identified in its FTIR spectrum. The presence of two small peaks at 2900 $cm^{-1}$ and 2800 $cm^{-1}$ was attributed to aliphatic —$CH_2$ and —$CH_3$ stretching vibrations. The characteristic sharp and deep Si—O—Si vibration band of M zeolite was found at 1060 $cm^{-1}$. which confirmed the establishment of the MCM-41 framework.

In addition, another peak of the MCM-41 framework was found at 800 $cm^{-1}$, which showed the presence of Si—O stretching vibration. Similarly, the ISM zeolite shows all of the peaks identified in FTIR of M zeolite, but an additional broad peak was found spanning from 3600 cm$^{-1}$ to 3400 cm$^{-1}$ due to the stretching vibration of the N—H bond of NTSDETA. Another characteristic peak of C—N bond stretching was found at around 1300 cm$^{-1}$, which further confirmed the presence of NTSDETA in ISM zeolite. The FTIR of the PSM zeolite showed a similar pattern to that of ISM zeolite. However, the intensity of the peaks was quite lower compared to ISM zeolite, which indicated that post-synthetic modification (PSM) was not as effective as in situ synthetic modification (ISM) in functionalizing the M zeolite. The ISM zeolite has more amine functional groups, which can effectively crosslink in the active layer of the membrane. FIG. 4B showed the fingerprint region of ATR-FTIR of the various versions of MCM-41.

Figures 5A, 5B:
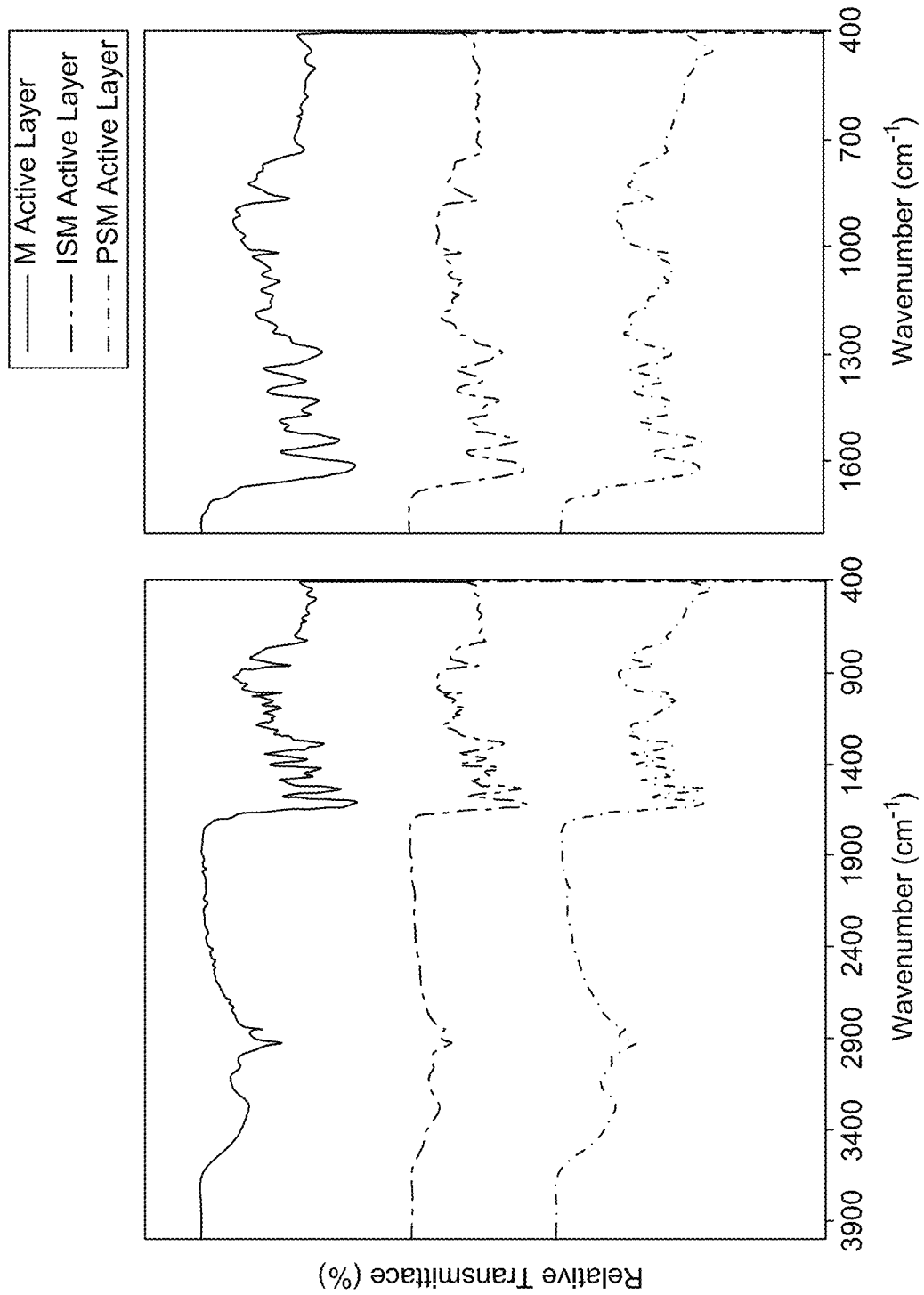
FIG. 5A shows ATR-FTIR of an active layer of a membrane fabricated using M zeolite, ISM zeolite, and PSM zeolite along with tetramine and terephthaloyl chloride (TPC), according to an aspect of the present disclosure.
FIG. 5B shows a fingerprint region of the ATR-FTIR spectra of FIG. 5A, according to an aspect of the present disclosure.

The structure of the free-standing active layers of all membranes prepared using M zeolite, ISM zeolite, and PSM zeolite was also studied. The ATR-FTIR spectra of the active layers of the membranes are given in FIG. 5A and FIG. 5B. Based on FIG. 3 for IP and the resultant active layer, the presence of various functionalities including —NH, —CONH, >C=O, —Si—O—Si—, —CH, —CH$_2$, and —CH$_3$ was confirmed by ATR-FTIR. The ATR-FTIR of all active layers revealed the presence of —NH stretching of amide (—CONH) bonds in the active layers of the membranes in the form of a broad and a deep peak in the region of 3600 cm$^{-1}$ and 3300 cm$^{-1}$. The second characteristic peak of the carbonyl (>C=O) group was found to be located at around 1600 cm$^{-1}$. Identifying the amide (—CONH) bond confirms the formation of an active layer comprising poly-amides decorated with various amine-functionalized variants of MCM-41. Moreover, the presence of two previously identified peaks (FIG. 4A) at 2900 cm$^{-1}$ and 2800 cm$^{-1}$ was due to —CH$_2$ and —CH$_3$. Similarly, the peaks at around 1000 cm$^{-1}$ and 800 cm$^{-1}$ were due to Si—O—Si and Si—O bond stretching, respectively (FIG. 5B).

Figures 6A, 6B:
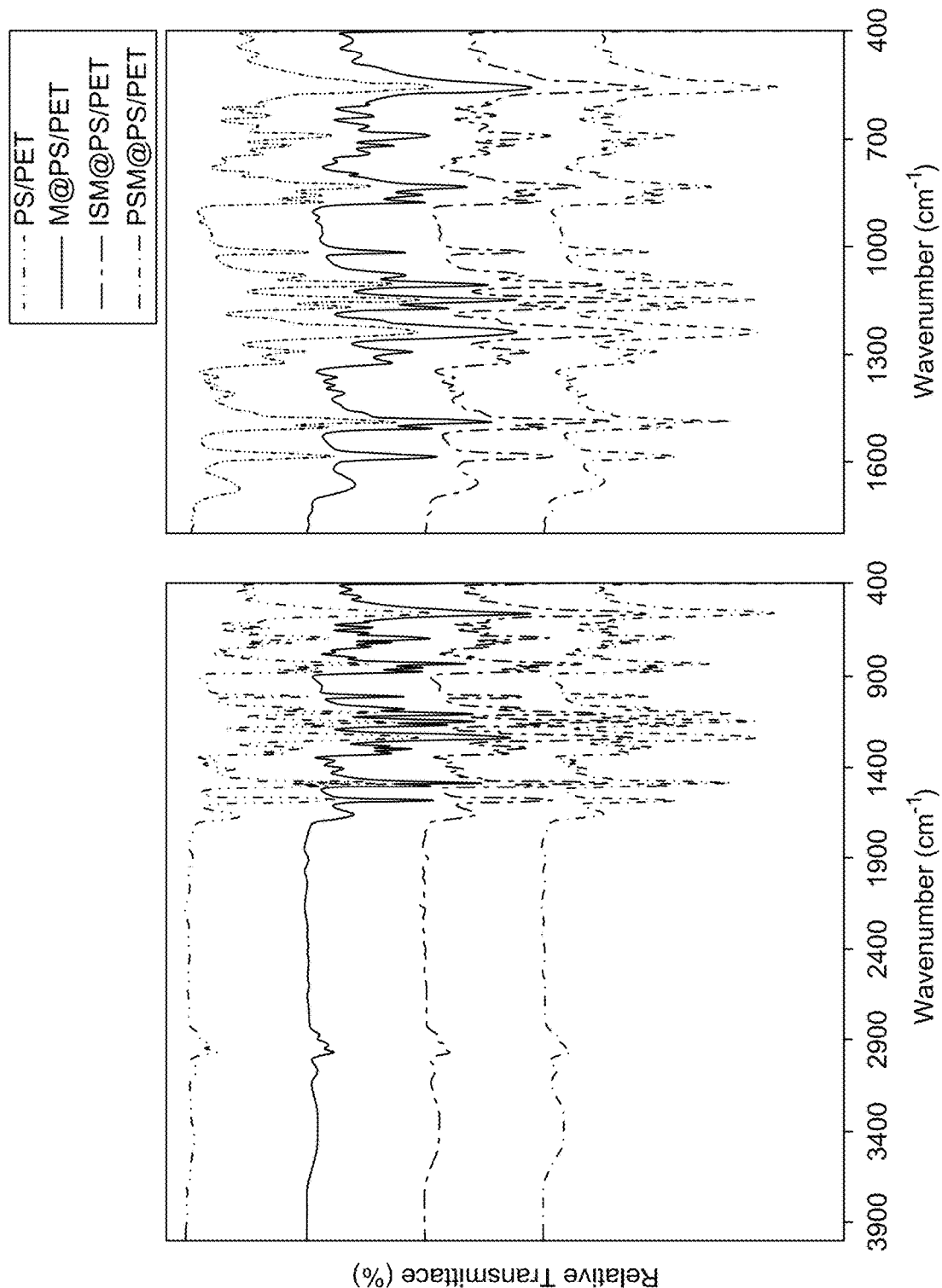
FIG. 6A shows ATR-FTIR of various membranes, namely polysulfone (PS)/polyethylene terephthalate (PET) support (PS/PET), M zeolite prepared on the PS/PET support (M@PS/PET), ISM zeolite prepared on the PS/PET support (ISM@PS/PET), and PSM zeolite prepared on the PS/PET support (PSM@PS/PET), according to an aspect of the present disclosure.
FIG. 6B shows a fingerprint region of the ATR-FTIR spectra of FIG. 6A, according to an aspect of the present disclosure.
Figure 7A:
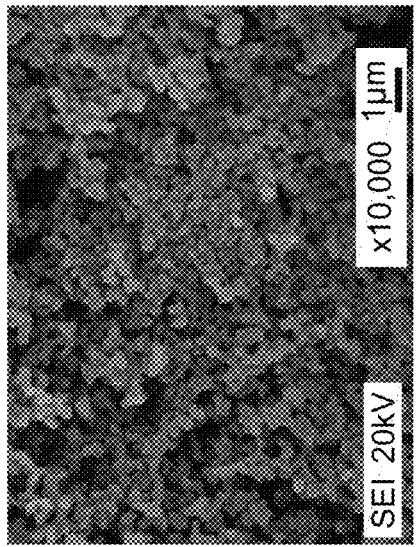
FIG. 7A-FIG. 7C depict scanning electron microscopic (SEM) micrographs of M zeolite, at different magnifications, according to an aspect of the present disclosure.
Figure 7B:
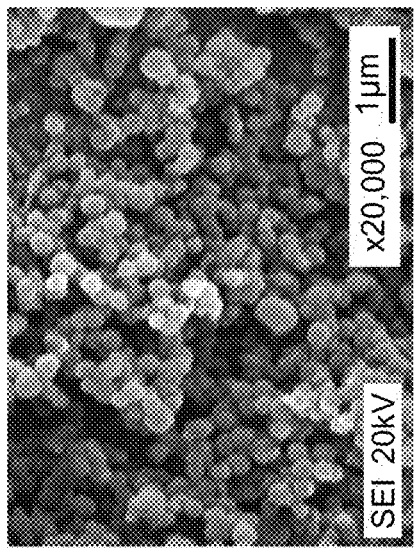
Figure 7C:
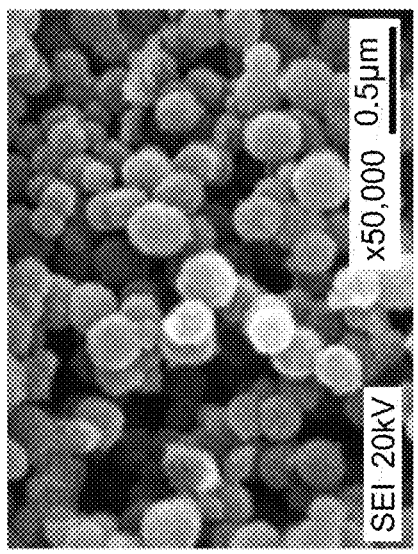
Figure 7D:
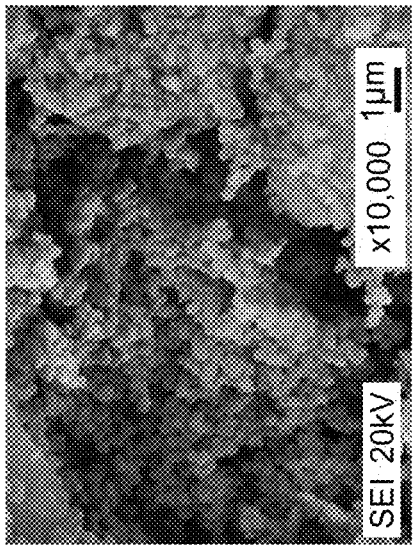
FIG. 7D-FIG. 7F depict SEM micrographs of ISM zeolite, at different magnifications, according to an aspect of the present disclosure.
Figure 7E:
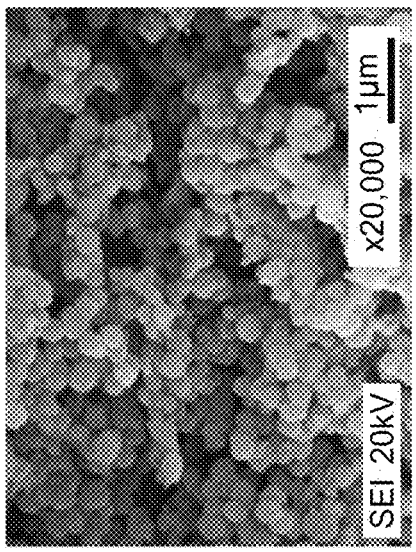
Figure 7F:
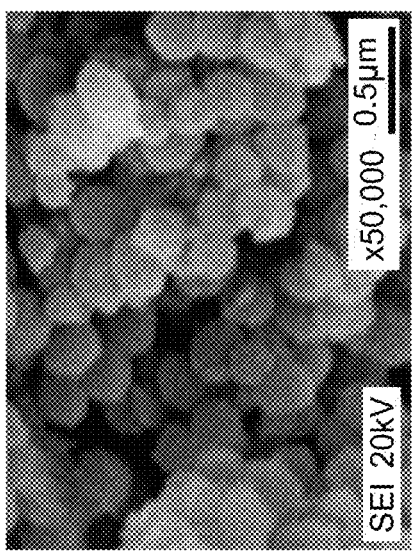
Figure 7I:
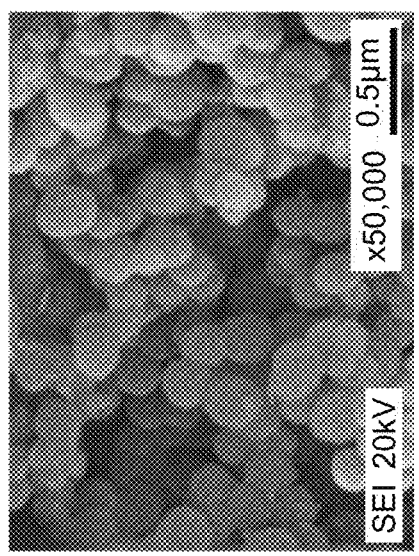
FIG. 7G-FIG. 7I depict SEM micrographs of PSM zeolite, at different magnifications, according to an aspect of the present disclosure.
Figure 7H:
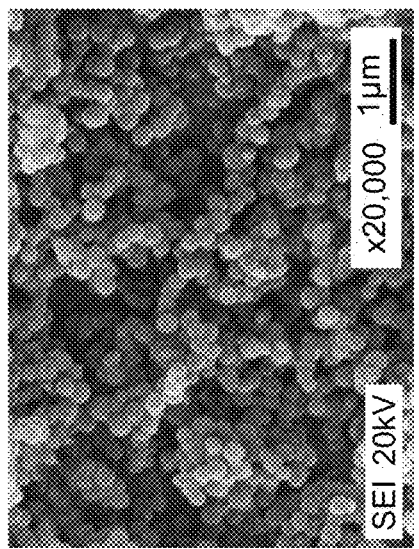
Figure 7G:
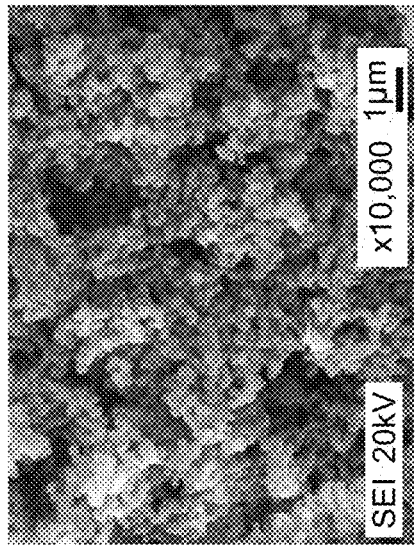
Figure 8A:
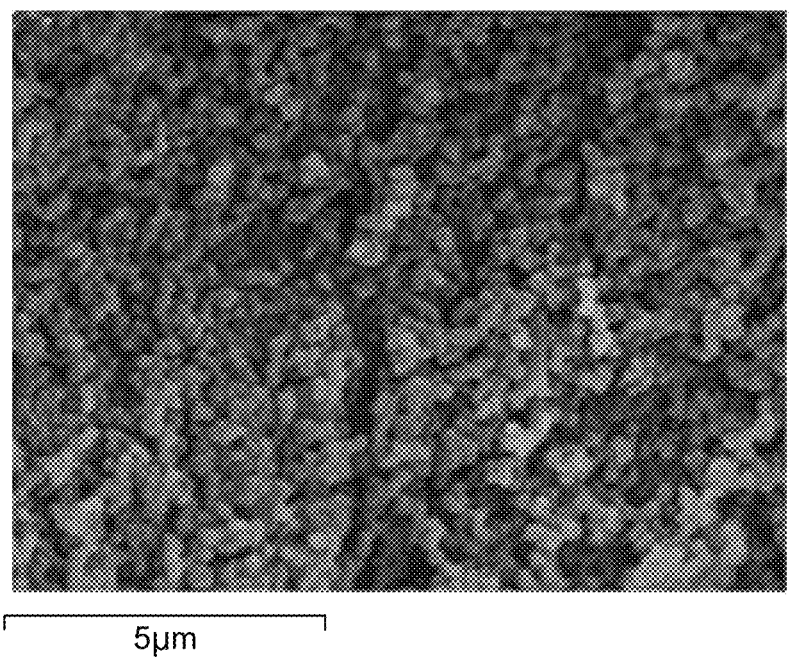
FIG. 8A and FIG. 8B depict energy dispersive X-ray spectroscopic (EDX) analysis of M zeolite, according to an aspect of the present disclosure.
Figure 8B:
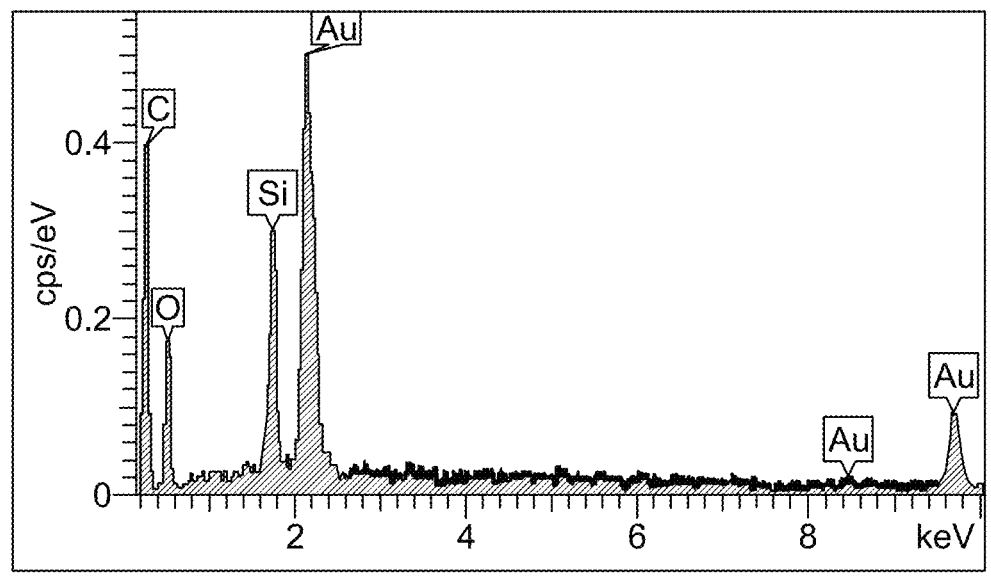
Figure 8C:
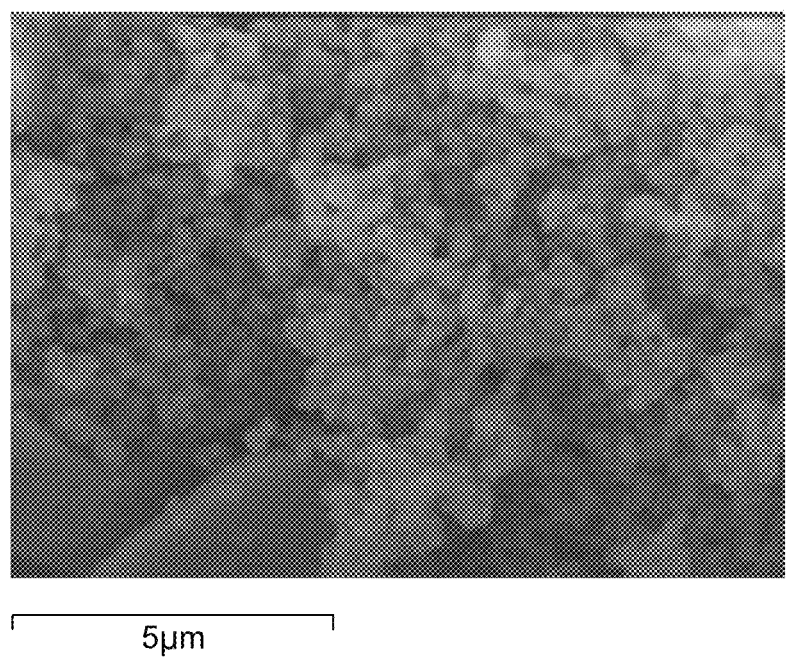
FIG. 8C and FIG. 8D depict EDX analysis of ISM zeolite, according to certain embodiments.
Figure 8D:
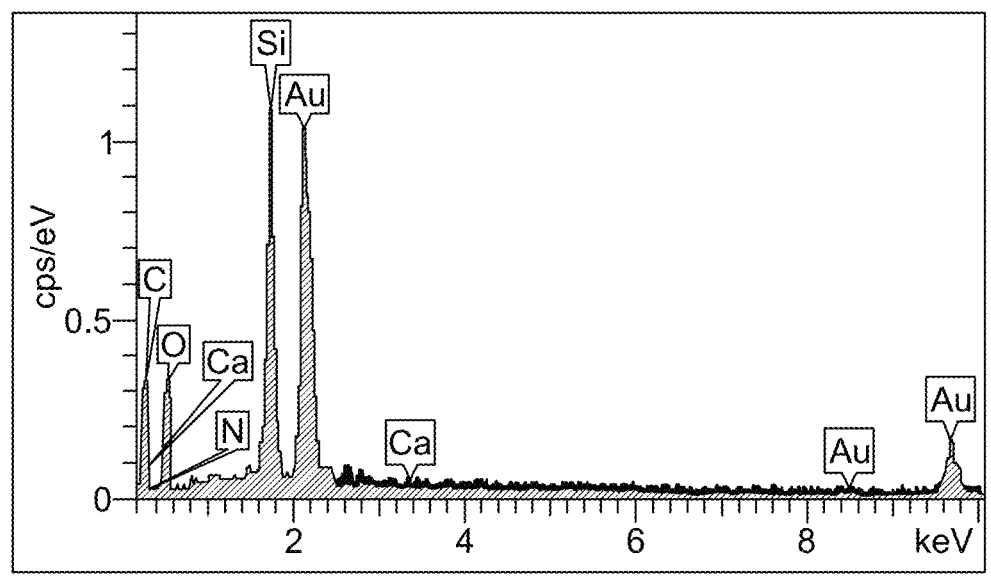
Figure 8E:
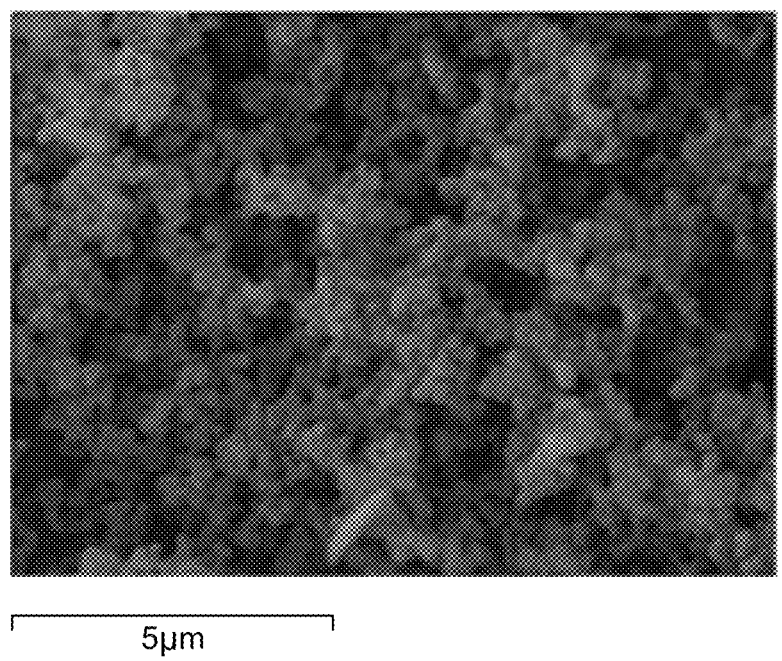
FIG. 8E and FIG. 8F depict EDX analysis of PSM zeolite, according to an aspect of the present disclosure.
Figure 8F:
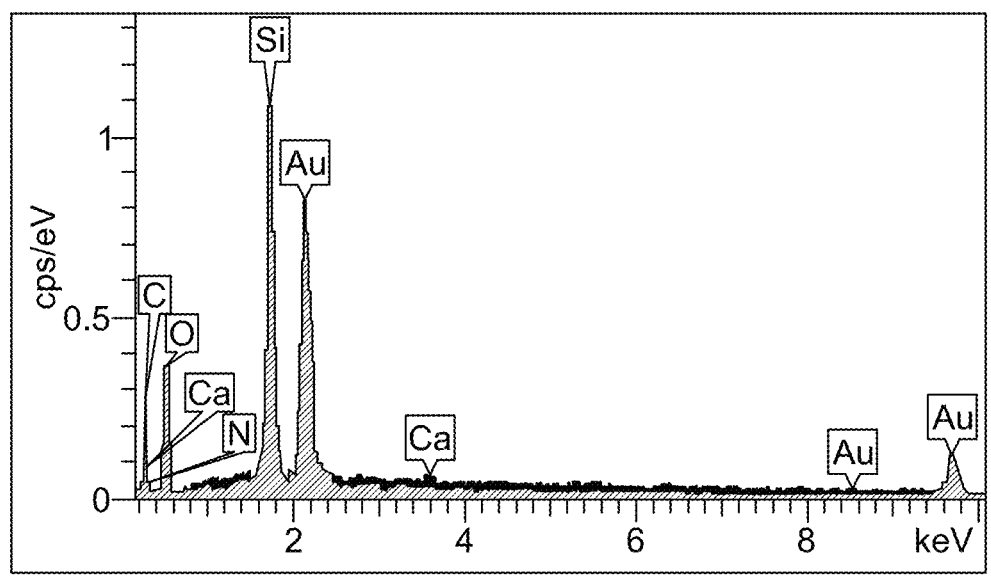
Figure 9A:
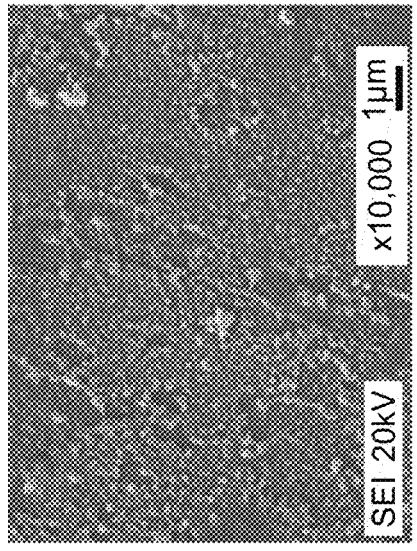
FIG. 9A-FIG. 9C depict SEM micrographs of the M@PS/PET membrane, according to an aspect of the present disclosure.
Figure 9B:
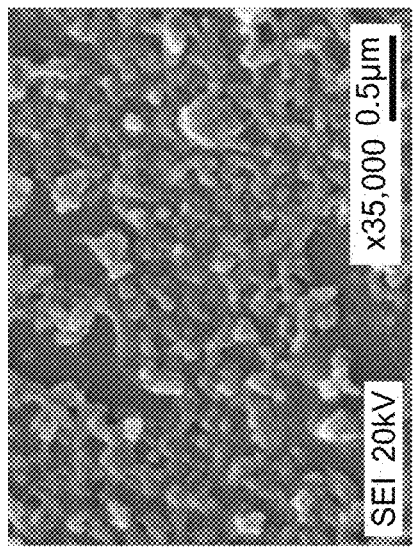
Figure 9C:
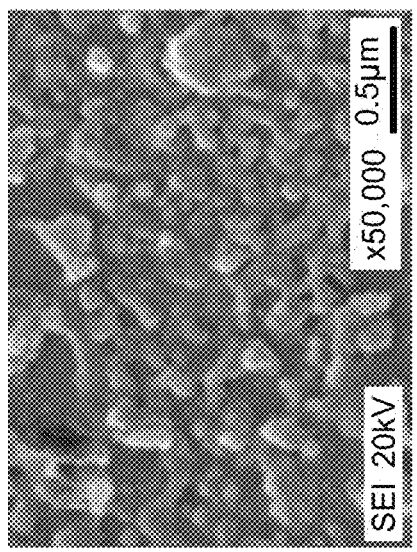
Figure 9D:
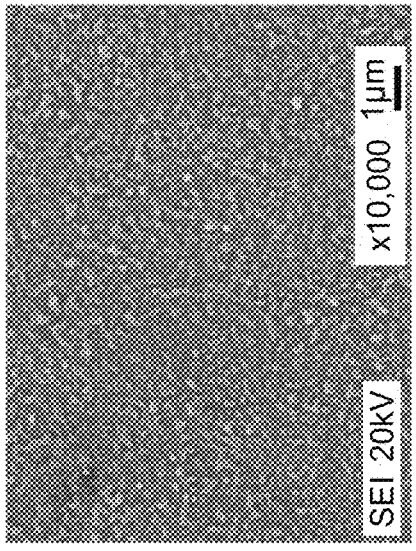
FIG. 9D-FIG. 9F depict SEM micrographs of the ISM@PS/PET membrane, according to an aspect of the present disclosure.
Figure 9E:
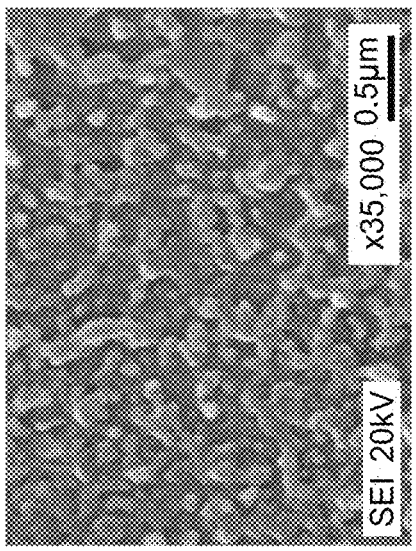
Figure 9F:
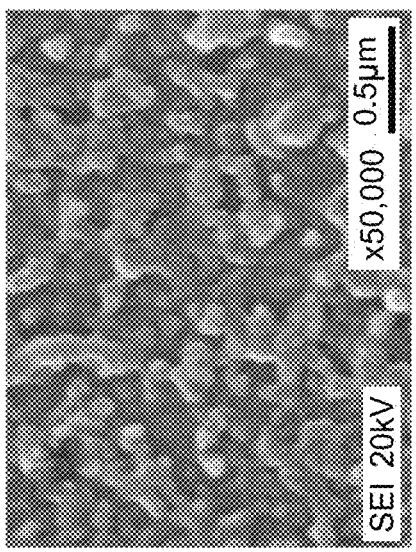
Figure 9I:
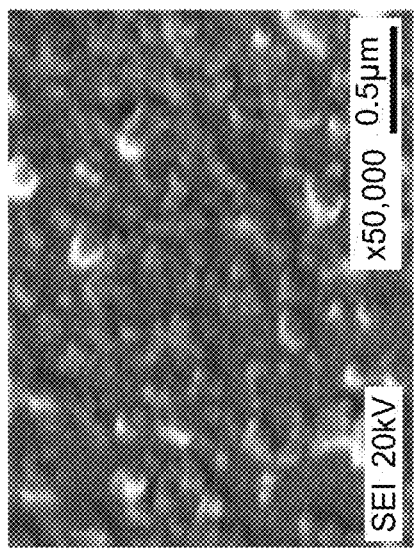
FIG. 9G-FIG. 9I depict SEM micrographs of the PSM@PS/PET membrane, according to an aspect of the present disclosure.
Figure 9H:
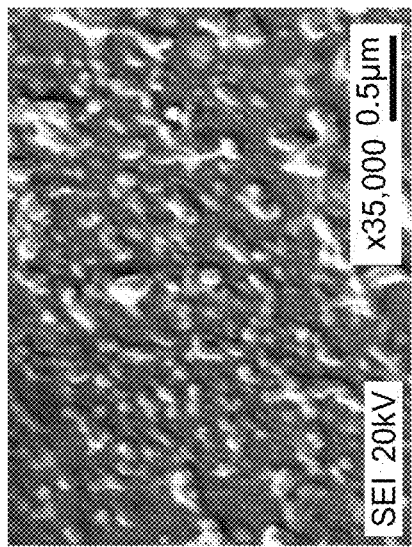
Figure 9G:
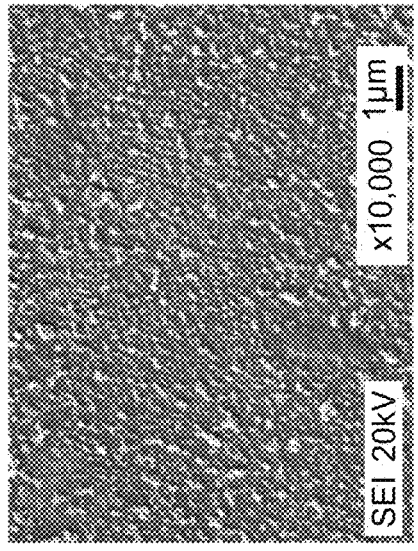

The ATR-FTIR of membranes revealed the presence of several characteristic peaks, including amide, carbonyl, Si—O—Si, and Si—O bonds of active layers of the fabricated membranes (FIG. 6A and FIG. 6B). As the active layer of the membrane is composed of a polyamide crosslinked network, a broad and deep band in the range of 3700 cm$^{-1}$ to 3300 cm$^{-1}$ was due to the stretching N—H frequency of amide linkage (—CONH). In addition, a sharp stretching band of aromatic —C—H bond was found to be located at 3000 cm$^{-1}$, which was indicative of the phenyl ring of the TPC crosslinker. The presence of aliphatic —C—H stretching of alkyl chains of different reacting monomers was confirmed by the existence of bands located at around 2900 cm$^{-1}$. Another confirmatory peak was found at around 1700 cm$^{-1}$, which was supportive of the carbonyl group (>C=O) of the amide linkage (—CONH). The fingerprint region indicates the presence of peaks also identified in the previous FTIR spectra of the starting materials.

The SEM analysis of mesoporous M zeolite, ISM zeolite, and PSM zeolite is given in FIG. 7. The morphology of mesoporous M zeolite revealed the presence of fine granular particles of similar size distributed throughout the structure of M zeolite. Moreover, the M zeolite appears highly porous, which is a desired feature for the fabrication of the membranes, which will help separate salts while allowing water to permeate through the membrane (FIG. 7A-FIG. 7C). After ISM and PSM amine functionalization, the morphology of the MCM-41 was almost the same in both cases. However, the particle size of ISM zeolite and PSM zeolite was slightly increased compared to M zeolite, along with increased porosity as the granular particles became bigger (FIG. 7D-7I). A closer look at the morphology of ISM zeolite and PSM zeolite showed that the ISM zeolite has a more uniform distribution, while in the case of PSM zeolite, the particles show slight agglomeration (FIG. 7I). This might be due to fact that in ISM the NTSDETA is chemically bonded in Si—O—Si framework of M zeolite whereas in PSM the NTSDETA acted as a capping agent where the silane is coated on already synthesized M zeolite. The morphology and smaller size of particles is a feature for uniform distribution and crosslinking of the particles in the active layer of the membrane.

The elemental composition of the different variants of the M zeolite was determined by EDX analysis, represented in FIG. 8. The M zeolite showed an elemental composition of carbon (C), oxygen (O), and silicon (Si) with percentages of 64.4%, 30.0%, and 5.5%, respectively (FIG. 8A and FIG. 8B). The ISM zeolite showed an elemental composition of C, O, Si, and nitrogen (N) which were found to be 48.7%, 34.2%, 13.7%, and 3.5%, respectively (FIG. 8C and FIG. 8D). Similarly, PSM zeolite showed a similar composition to that of ISM zeolite with C (45.6%), O (33.9%), Si (14.7%) and N (5.7%) FIG. 8E and FIG. 8F). The presence of N confirms that the ISM zeolite and PSM zeolite were successfully capped with NTSDETA. Since EDX is a surface characterization technique which might be the reason for the higher percentage of N in PSM zeolite.

The SEM micrographs of PSf support, M@PS/PET, ISM@PS/PET, and PSM@PS/PET are shown in FIG. 9. After the IP reaction, the surface morphology of the M@PS/PET appeared completely covered with M zeolite particles. The M@PS/PET has a thick textured surface morphology loaded with abundant M zeolite in the form of patches (FIG. 9A-FIG. 9C). The surface morphology of the membrane was further altered after the incorporation of amino-functionalized MCM-41 (FIG. 9D-FIG. 9I). The ISM zeolite nanoparticles appeared uniformly distributed and embedded in the active layer of the membrane. This might be due to the increased compatibility of the ISM@PS/PET with the active layer comprising polyamides of the membrane augmented by numerous amine functions of ISM zeolite. Including NTSDETA increases the number of alkyl chains in chemically modified MCM-41, which in turn causes an enhancement in the familiarity of the active layer with both ISM zeolite and PSM zeolite. Moreover, the presence of multiple amino groups in ISM zeolite and PSM zeolite causes an enhancement in the covalent bonding of these materials with the active layer comprising polyamides during the IP reaction. An interpretation of surface morphologies of the fabricated membranes showed that the incorporation of ISM zeolite led to an ideal morphology comparable to commercial desalination membranes.

Figure 10A:
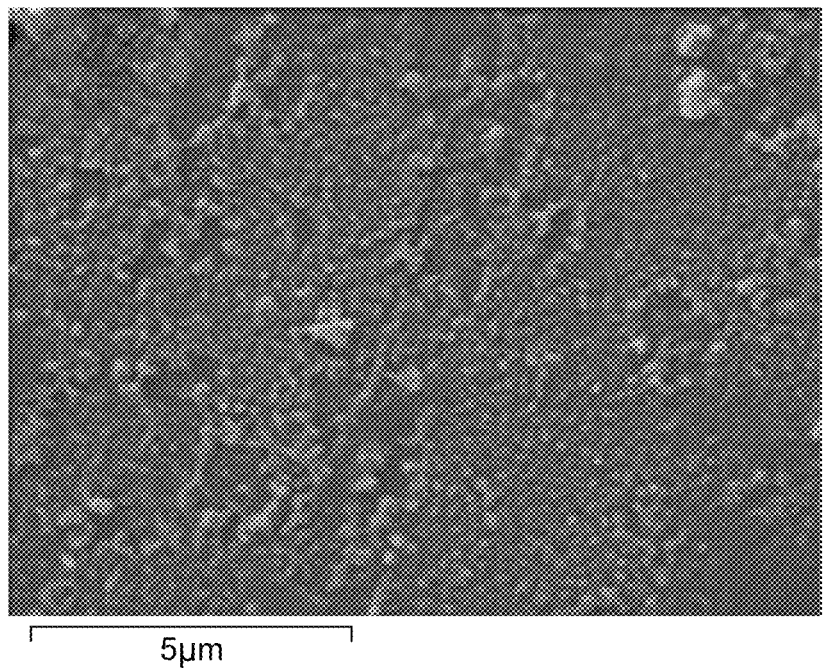
FIG. 10A-FIG. 10B depict EDX analysis of the M@PS/PET membrane, according to an aspect of the present disclosure.
Figure 10B:
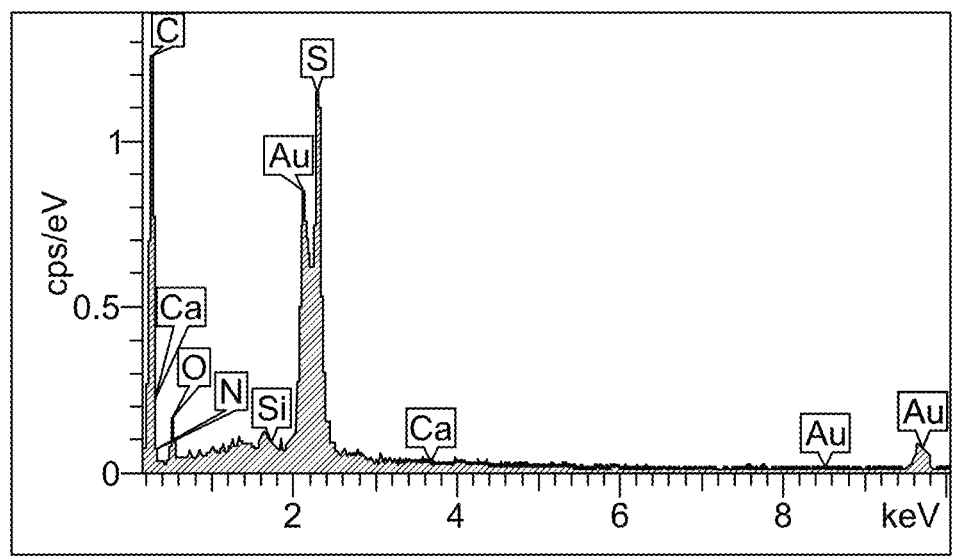
Figure 10C:
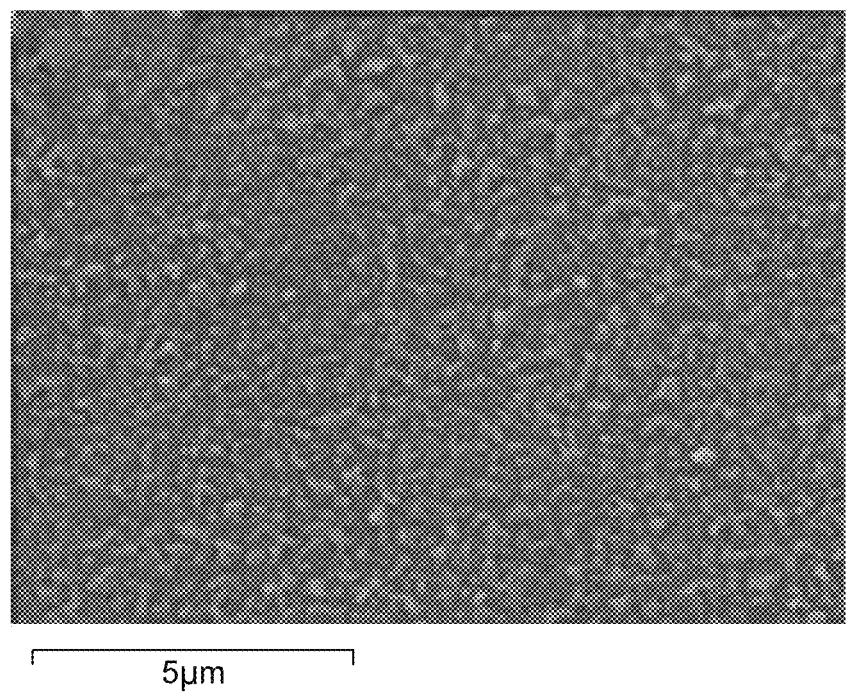
FIG. 10C-FIG. 10D depict EDX analysis of the ISM@PS/PET membrane, according to certain embodiments.
Figure 10D:
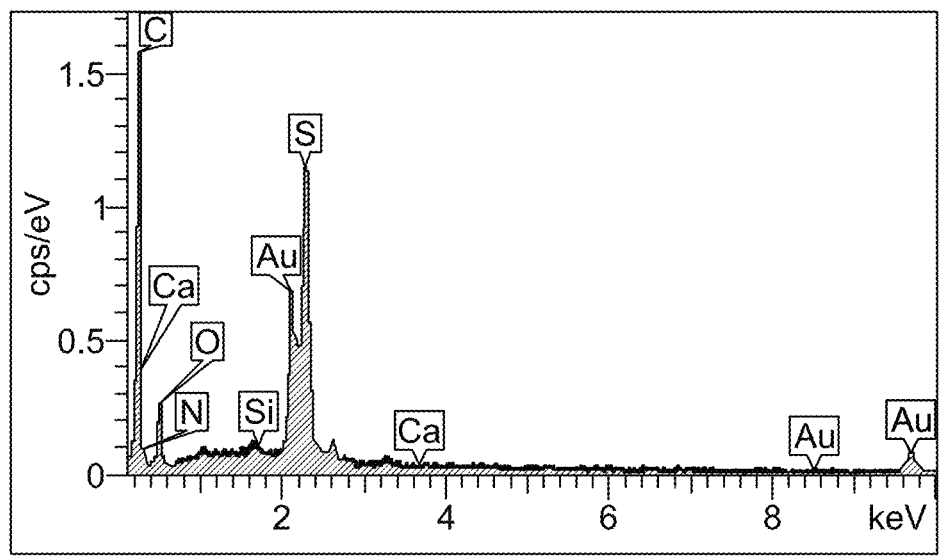
Figure 10E:
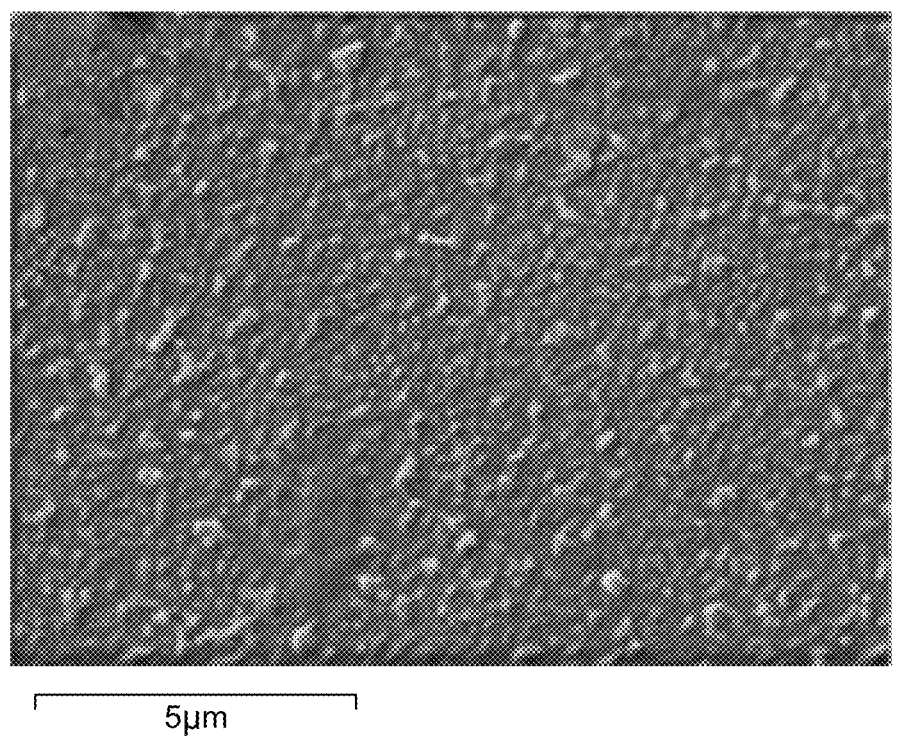
FIG. 10E-FIG. 10F depict EDX analysis of the PSM@PS/PET membrane, according to an aspect of the present disclosure.
Figure 10F:
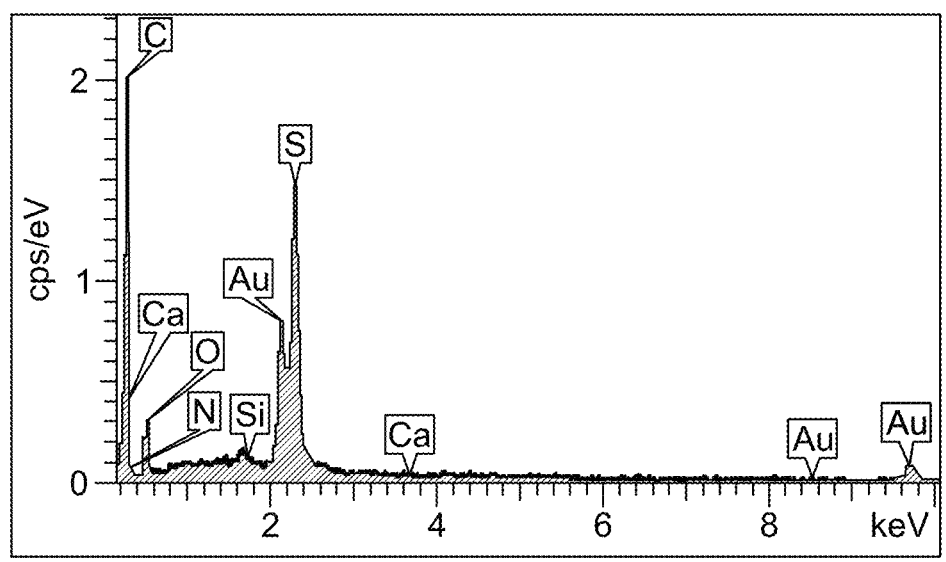

The elemental composition of the M@PS/PET membrane (FIG. 10A-FIG. 10B), ISM@PS/PET membrane (FIG. 10C-FIG. 10D), and PSM@PS/PET membrane (FIG. 10E and FIG. 10F) are depicted. All the anticipated elements, namely C, O, N, Si, and S (sulfur), are present in all membranes. The C and O are present in all contributing polymers, including polysulfone (PSf), polyester terephthalate (PET), NTSDETA, M zeolite, and polyamide. The presence of S was attributed to PSf, while Si was attributed to M zeolite and NTSDETA. Notably, the presence of N was attributed to polyamide and NTSDETA. These observations confirmed the successful fabrication of the filtration membranes.

Figure 11C:
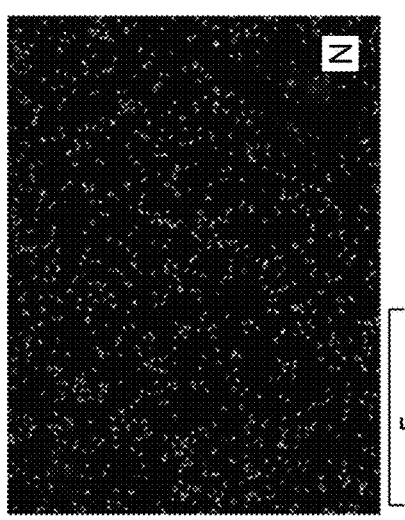
FIG. 11C shows an elemental map of nitrogen in the ISM@PS/PET membrane, according to an aspect of the present disclosure.
Figure 11F:
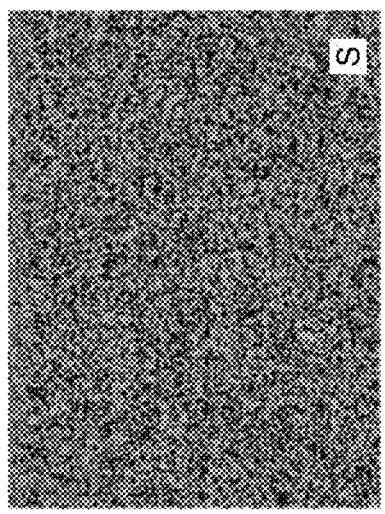
FIG. 11F shows an elemental map of sulfur in the ISM@PS/PET membrane, according to an aspect of the present disclosure.
Figure 11B:
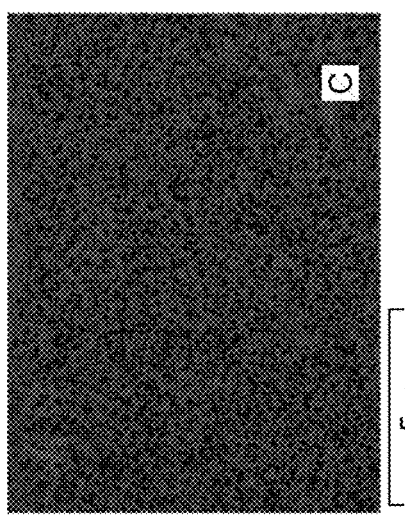
FIG. 11B shows an elemental map of carbon in the ISM@PS/PET membrane, according to an aspect of the present disclosure.
Figure 11E:
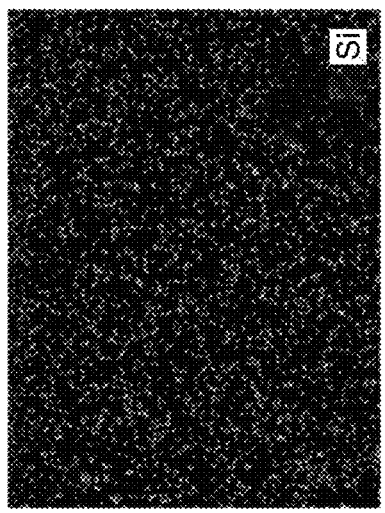
FIG. 11E shows an elemental map of silicon in the ISM@PS/PET membrane, according to an aspect of the present disclosure.
Figure 11A:
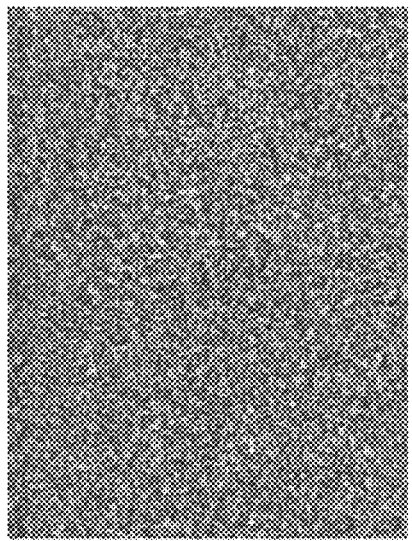
FIG. 11A is an EDX layered image of the ISM@PS/PET membrane, according to an aspect of the present disclosure.
Figure 11D:
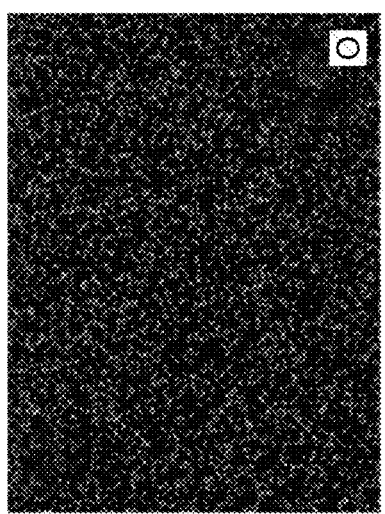
FIG. 11D shows an elemental map of oxygen in the ISM@PS/PET membrane, according to an aspect of the present disclosure.

The distribution of elements in the active layer (first layer) of the ISM@PS/PET membrane is depicted in FIG. 11A. It was observed that all of the contributing elements, namely carbon (FIG. 11B), nitrogen (FIG. 11C), oxygen (FIG. 11D), silicon (FIG. 11E), and sulfur (FIG. 11F), were equally and uniformly distributed in the active layer of the membrane. It was observed that the density of the particles in each mapping image was directly related to their relevant percentage in the active layers of the membranes.

Figure 12A:
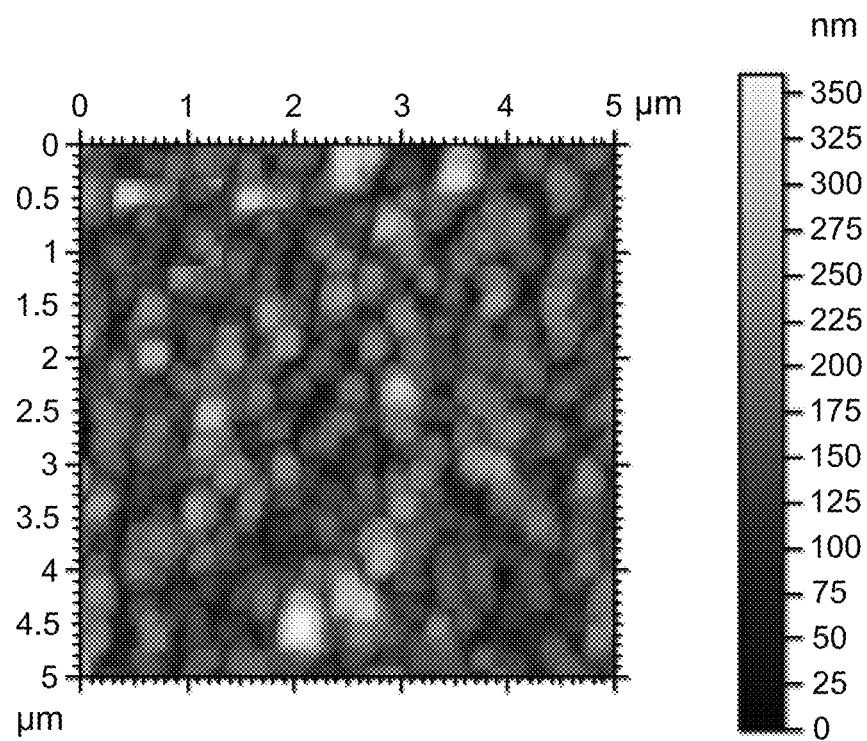
FIG. 12A-FIG. 12B show 2D & 3D atomic force microscopy (AFM) images of the M@PS/PET membrane, respectively, according to an aspect of the present disclosure.
Figure 12B:
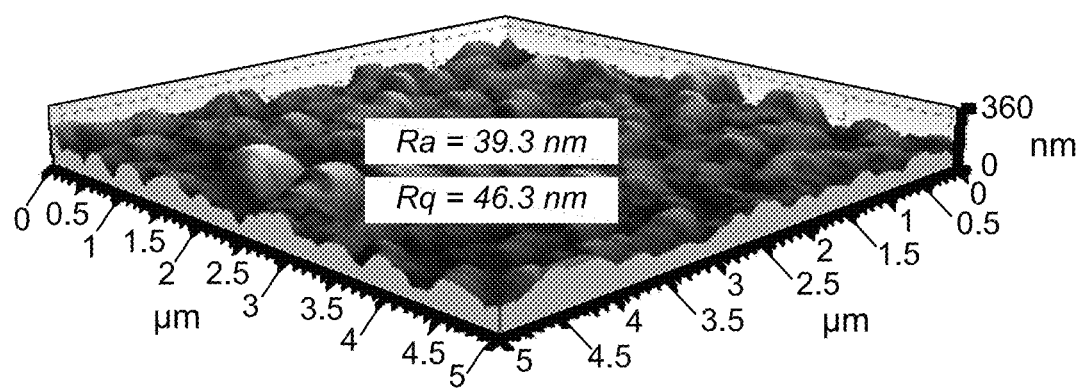
Figure 12C:
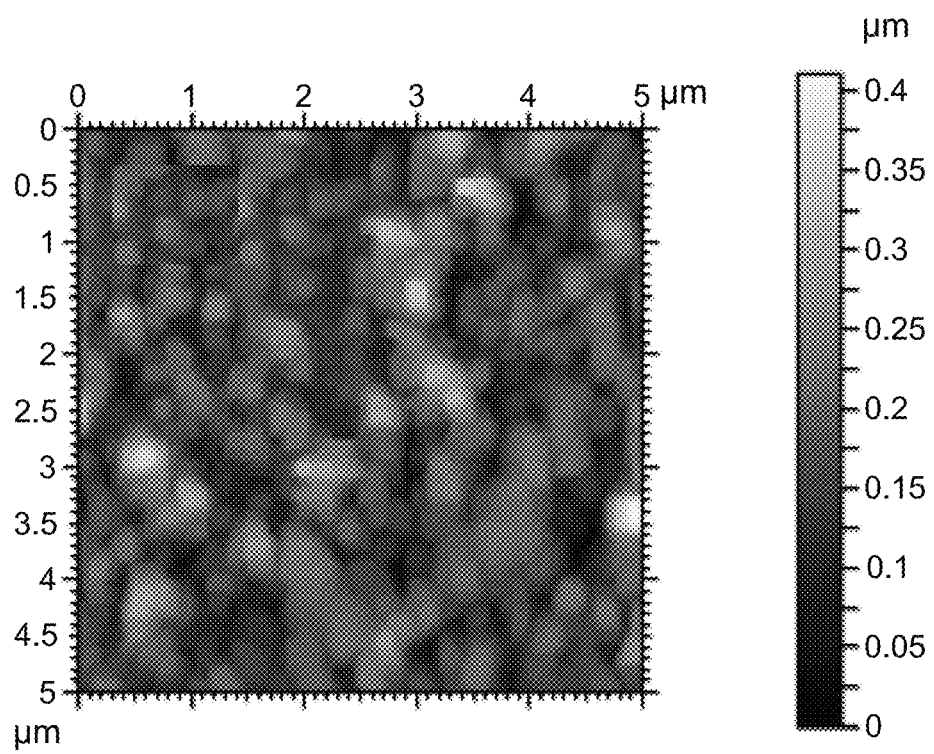
FIG. 12C-FIG. 12D show 2D & 3D AFM images of the ISM@PS/PET membrane, respectively, according to an aspect of the present disclosure.
Figure 12D:
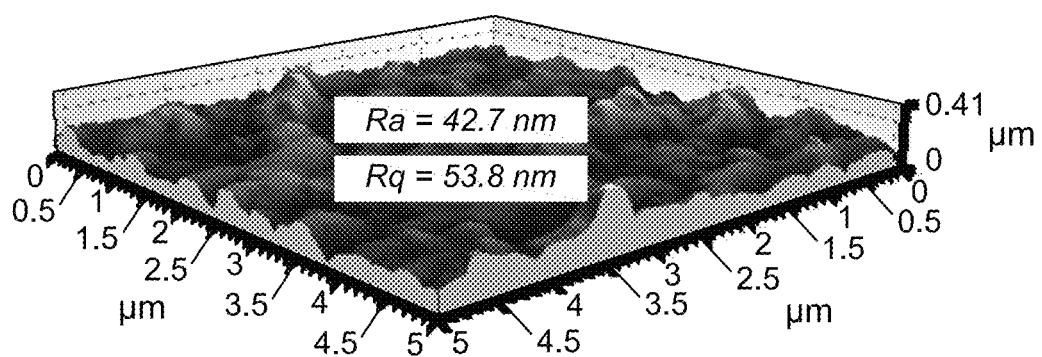
Figure 12E:
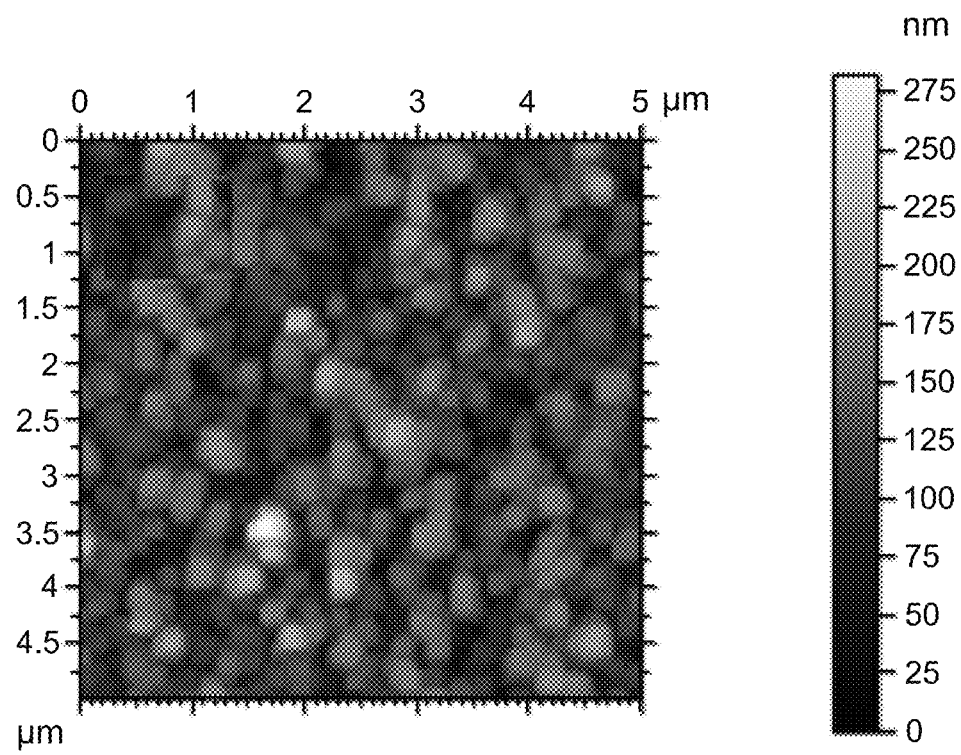
FIG. 12E-FIG. 12F show 2D & 3D AFM images of the PSM@PS/PET membrane, respectively, according to an aspect of the present disclosure.
Figure 12F:
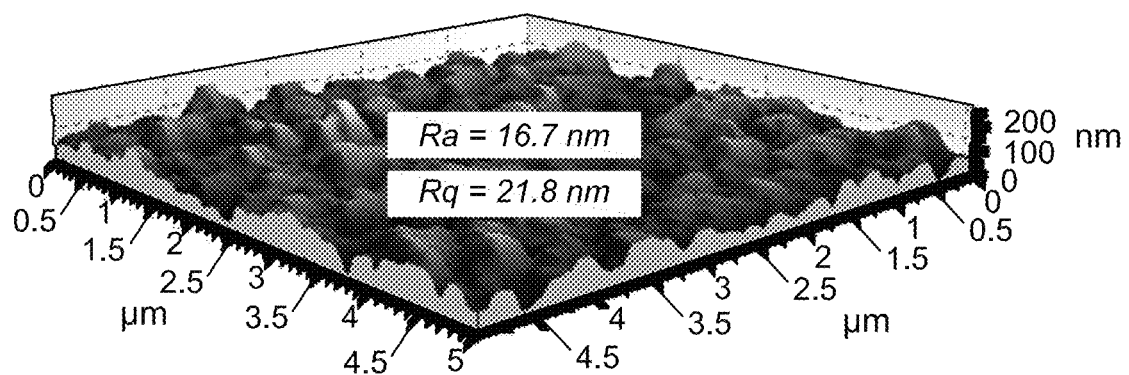

The membrane surface roughness is a feature that plays a role in evaluating filtration performance. The presence of an active layer is evident in the case of all three membranes, which is illustrated in two-dimensional (2D) images of the membranes M@PS/PET (FIG. 12A), ISM@PS/PET (FIG. 12C), and PSM@PS/PET (FIG. 12E). The AFM images of three membranes revealed that the surface roughness is uniform over an entire area of the membranes. The three-dimensional (3D) images of the membrane surface exhibited that the M@PS/PET (FIG. 12B) membrane has an average surface roughness ($R_a$) of 39.3 nm and ISM@PS/PET (FIG. 12D) showed an increase in surface roughness as $R_a$ reached 42.7 nm. These observations agree with the findings of SEM analysis, in which ISM@PS/PET showed uniform growth of well-defined polyamide ridge-and-valley-like patterns. In the case of PSM@PS/PET (FIG. 12F), the surface roughness was decreased as $R_a$ reached 16.7 nm, which is attributed to lesser growth of the active polyamide layer which leads to lower rejection of salts during filtration performance analysis.

Figure 13:
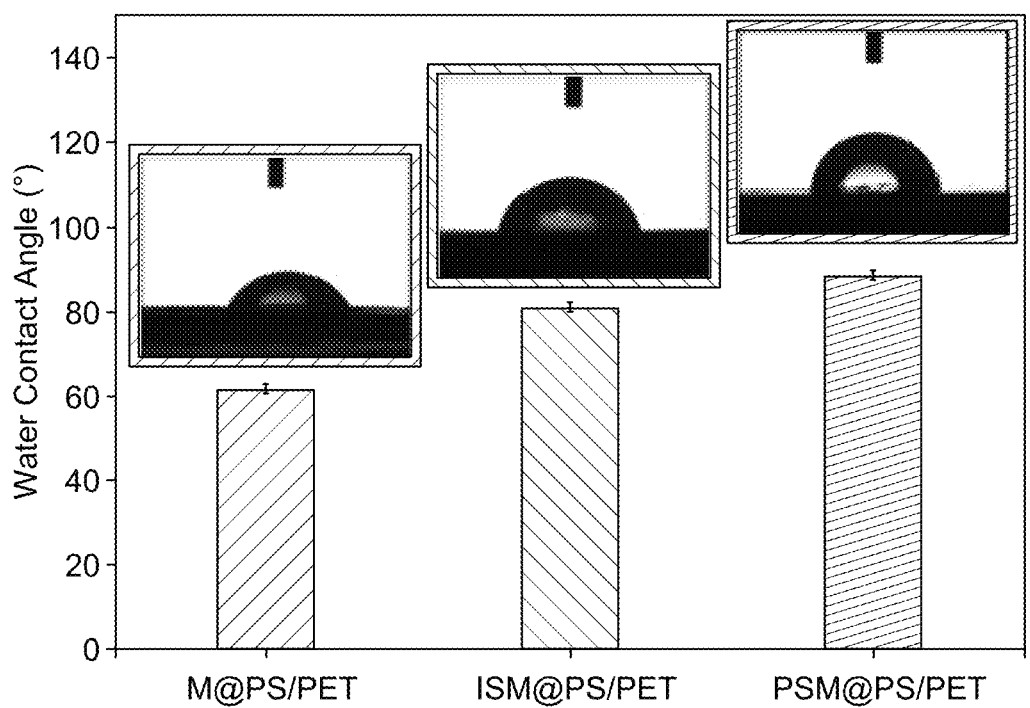
FIG. 13 is a bar graph showing a water contact angle of various membranes, M@PS/PET membrane, ISM@PS/PET membrane, and PSM@PS/PET membrane, according to an aspect of the present disclosure.

The surface hydrophilicity of the membranes was determined by measuring the water contact angle (WCA) of all of the membranes (FIG. 13). It was seen that M@PS/PET showed the lowest WCA (60°) among all of the fabricated membranes. Upon amine functionalization of M zeolite with NTSDETA, the WCA was increased to 78° for the ISM membrane, while a WCA of 88° was found for the PSM membrane. This increase in WCA showed that the functionalization of M zeolite by NTSDETA introduced organic propyl and ethyl chains, which led to reduced hydrophilicity of the resultant membranes. However, in the case of non-functionalized M zeolite, such alkyl chains are not present.

Evaluation of Nanofiltration Performance of Membranes
Effect of Feed Pressure on Permeate Pure Water Flux To summarize, three different thin film composite nanofiltration (TFC-NF) membranes were fabricated by covalently decorating the active layer with three variants of MCM-41. Among the three membranes, ISM@PS/PET showed the best performance in terms of rejecting salts, as the highest rejection of $MgCl_2$ and $CaCl_2$ was recorded to be 97% by ISM@PS/PET, followed by $MgSO_4$ (90%) and $Na_2SO_4$ (87%). When the three membranes were applied for micropollutants removal, the ISM@PS/PET showed the best performance among all of the fabricated membranes as the rejection of sulfamethoxazole reached 93% while that of amitriptyline HCl was found to be 89%. The ISM@PS/PET membrane showed an increase in permeate flux as the feed pressure varied from 5 bar to 25 bar, and the permeate flux jumped from 8 LMH (L $m^{-2}h^{-1}$) to 38 LMH. Among the different approaches used for membrane fabrication, the ISM approach was found to be the best suited for separating pollutants.

Figure 14A:
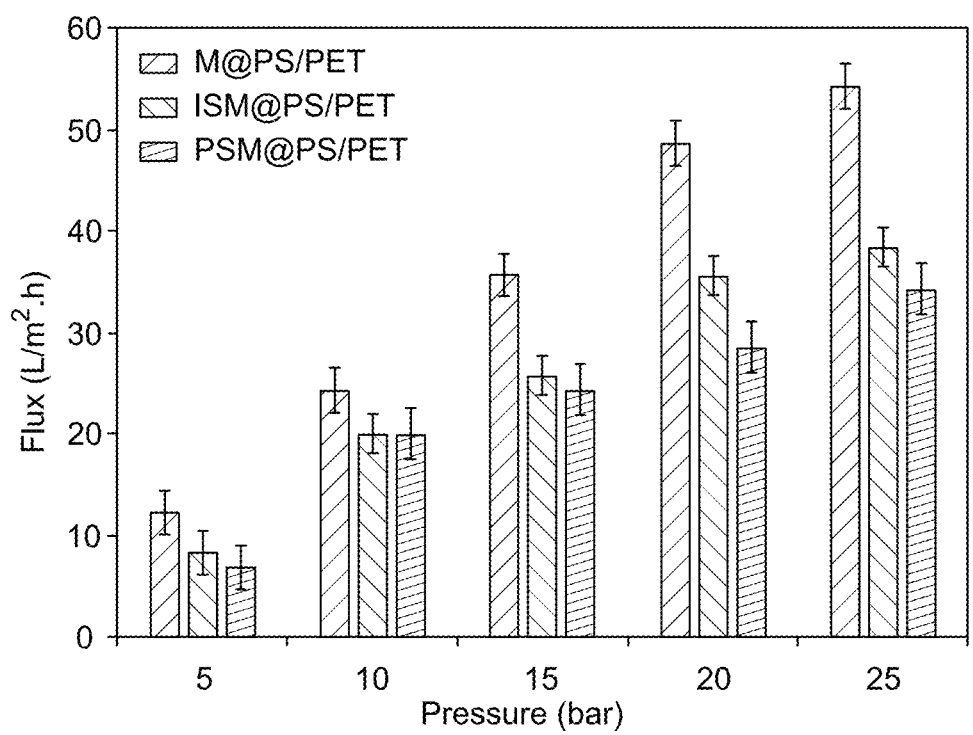
FIG. 14A is a bar graph depicting the effect of increasing transmembrane pressure on permeate pure water flux for the various membranes, according to an aspect of the present disclosure.

The nanofiltration performance of the membranes was evaluated using a crossflow filtration setup, where all three membranes were installed in parallel, and DI water was used as feed. A linear relationship between feed pressure and permeate pure water flux was overserved, which is a common observation with any well-structured and stable membrane. As the feed pressure was varied from 5 bar to 25 bar, the permeate flux jumped from 12 LMH to 55 LMH in M@PS/PET, 8 LMH to 38 LMH for ISM@PS/PET, and 6 LMH to 34 LMH PSM@PS/PET. Therefore, the trend of decreasing permeate pure water flux of M@PS/PET>ISM@PS/PET>PSM@PS/PET was observed (FIG. 14A). This observation is supported by characteristic features of the membranes. It was observed in SEM analysis that the M@PS/PET did not have uniform covalent linking of the M zeolite; rather, M zeolite particles were lying on the membrane surface. However, in the case of ISM@PS/PET and PSM@PS/PET, uniform distribution and binding of both ISM zeolite and PSM zeolite particles were observed. The uniform distribution of particles resulted in the formation of a dense active layer. The dense active layer comprising polyamides decorated with amino-functionalized MCM-41 possessed relatively lower permeate pure water flux and vice versa.

Rejection of Divalent and Monovalent Ions

Figure 14B:
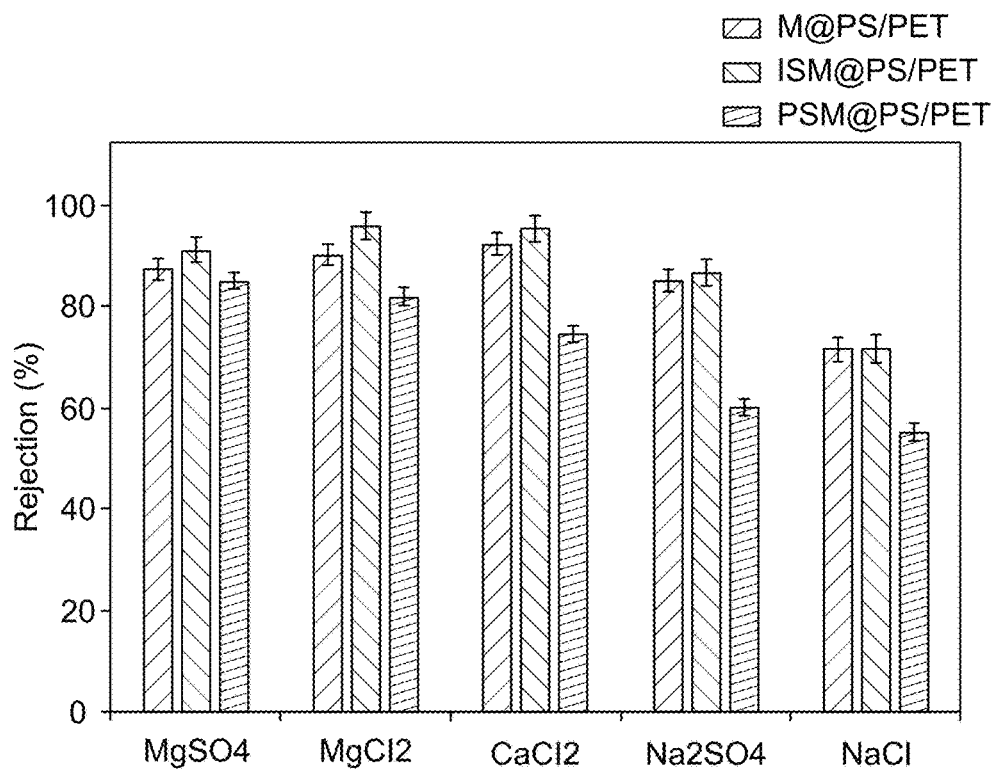
FIG. 14B is a bar graph depicting the rejection performance by the various membranes, using different salt solution feeds, at a pressure of 15 bar, according to an aspect of the present disclosure.

After studying the effect of feed pressure on permeate pure water flux, the rejection performance of all the membranes was analyzed using a series of divalent salts ($MgSO_4$, $MgCl_2$, $CaCl_2$, and $Na_2SO_4$) and monovalent salt (NaCl), as shown in FIG. 14B. Seawater contains a variety of divalent and monovalent salts, which makes seawater unfit for domestic, agricultural, and industrial purposes. Among all the tested membranes, the ISM@PS/PET showed the best performance in rejecting the salts. The highest rejection of $MgCl_2$ and $CaCl_2$ was recorded to be 97% by ISM@PS/PET, followed by $MgSO_4$ (90%) and $Na_2SO_4$ (87%) (FIG. 14B). In the case of monovalent NaCl, the rejection was 65% for both M@PS/PET and ISM@PS/PET. NaCl rejection was decreased further to 50% for PSM@PS/PET. Therefore, in comparing membranes in terms of rejection of divalent and monovalent salts, ISM@PS/PET showed increased performance compared to M@PS/PET and PSM@PS/PET. This was thought to be from the chemical structure of ISM zeolite as NTSDETA is covalently bonded in the framework of the MCM-41, which is not the case in both M zeolite and PSM zeolite. This feature enhances the probability of crosslinking of ISM zeolite and increases the organic content of MCM-41, making ISM zeolite highly compatible with the active layer comprising polyamides. The active layer of ISM@PS/PET is denser than the other two membranes, resulting in higher rejection of salts by ISM@PS/PET.

Rejection Performance of Membranes for Micropollutants

Figure 14C:
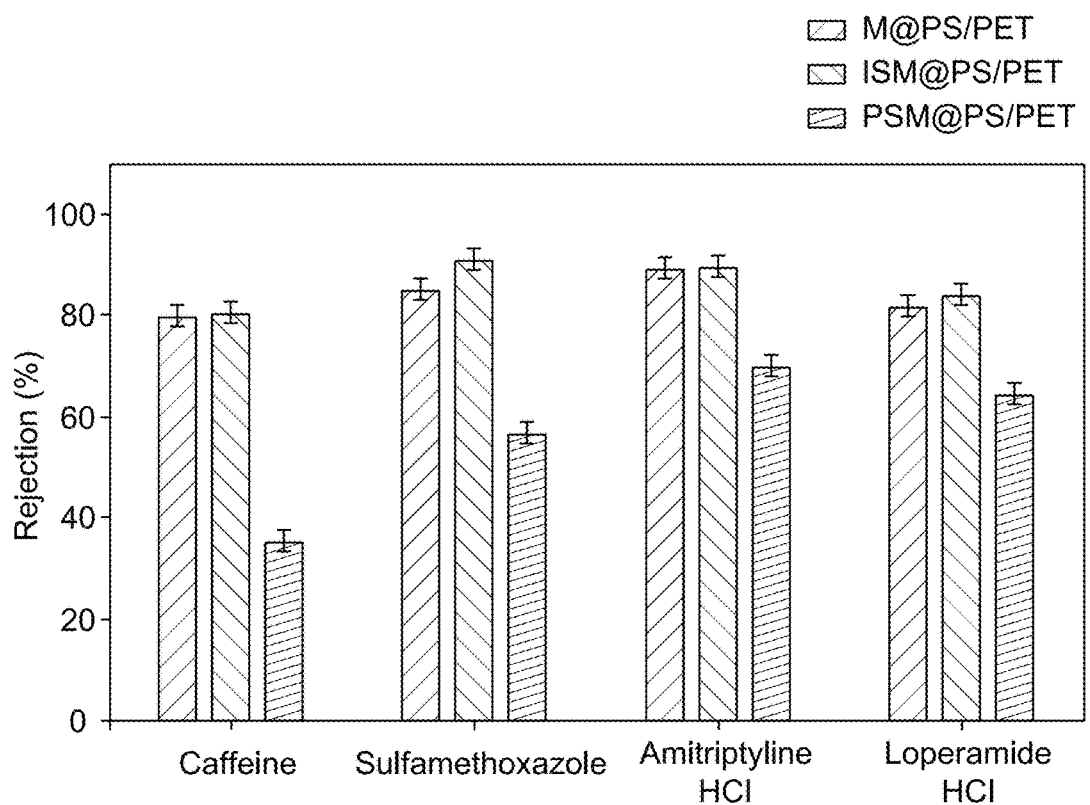
FIG. 14C is a bar graph showing the rejection of different pharmaceuticals (caffeine, sulfamethoxazole, amitriptyline hydrochloride, and loperamide hydrochloride) by the various membranes, at a pressure of 15 bar, according to an aspect of the present disclosure.

In addition to various salts in water, several other micropollutants, such as pharmaceutical drugs, are being discharged into water bodies. Four commonly used pharmaceutics (caffeine, sulfamethoxazole, amitriptyline HCl, and loperamide HCl) have been used as model micropollutants in a feed prepared in DI water. As with the desalination behavior of the membranes with different salts, ISM@PS/PET showed the best performance among the fabricated membranes. The rejection of sulfamethoxazole reached 93% while that of amitriptyline HCl was found to be 89% in ISM@PS/PET (FIG. 14C).

Numerous modifications and variations of the present disclosure are possible in light of the above teachings. It is, therefore, to be understood that, within the scope of the appended claims, the invention may be practiced otherwise than as specifically described herein.

The invention claimed is:
1. A filtration membrane, comprising:
a first layer comprising a triamine-functionalized polysilicate mesoporous material, wherein an orthosilicate group of the triamine-functionalized polysilicate mesoporous material is bonded to a silicon atom of a silicon-containing triamine to form a triamine-functionalized polysilicate backbone, wherein the silicon-containing triamine and one or more tetramines are covalently crosslinked with terephthaloyl chloride to form a polyamide,
wherein the triamine-functionalized polysilicate mesoporous material has a hierarchical structure of MCM-41;
a second layer comprising a polysulfone; and
a third layer comprising a polyester terephthalate.

2. The filtration membrane of claim 1, wherein the triamine-functionalized polysilicate mesoporous material contains an orthosilicate group covalently bonded to a terminal silicon atom of the silicon-containing triamine through an Si—O—Si—O—Si linkage as an integrated part of an orthosilicate network,
wherein the silicon-containing triamine is an $N^1$-(3-trimethoxysilylpropyl)diethyltriamine.

3. The filtration membrane of claim 1, wherein the triamine-functionalized polysilicate mesoporous material contains an orthosilicate group covalently bonded to a terminal silicon atom of the silicon-containing triamine through an Si—O—Si—O—Si linkage as an endcap of the orthosilicate network,
wherein the silicon-containing triamine is the $N^1$-(3-trimethoxysilylpropyl)diethyltriamine.

4. The filtration membrane of claim 1, wherein the silicon-containing triamine and one or more tetramines are covalently crosslinked with terephthaloyl chloride through at least one of a primary amine of the silicon-containing triamine and a secondary amine of the silicon-containing triamine, and at least one of a primary amine of the tetramine and a secondary amine of the tetramine,
wherein the tetramine is an N,N'-bis(3-aminopropyl)ethylenediamine.

5. The filtration membrane of claim 1, wherein one or more of a first tetramine and one or more of a second tetramine are covalently crosslinked with terephthaloyl chloride through at least one of a primary amine of the first tetramine and a secondary amine of the first tetramine, and at least one of a primary amine of the second tetramine and a secondary amine of the second tetramine,
wherein the first tetramine and the second tetramine is the N,N'-bis(3-aminopropyl)ethylenediamine.

6. The filtration membrane of claim 1, wherein the triamine-functionalized polysilicate mesoporous material has a porous, granular morphology with an average particle size of 10 to 50 nanometers in diameter.

7. The filtration membrane of claim 1, wherein carbon is present in the first layer in an amount of 40 to 70 percent, oxygen is present in the first layer in an amount of 25 to 40 percent, silicon is present in the first layer in an amount of 5 to 20 percent, and nitrogen is present in the first layer in an amount of 2 to 8 percent based on a total elemental composition of the first layer.

8. The filtration membrane of claim 1, wherein the membrane has an average surface roughness of 15 to 45 nm.

9. The filtration membrane of claim 1, wherein the membrane has a water contact angle of 55° to 95°.

10. The filtration membrane of claim 1, wherein the membrane has a permeate rate of flux of 30 to 60 L $m^{-2}h^{-1}$ at a feed pressure of 25 bar.

11. The filtration membrane of claim 1, wherein the triamine-functionalized polysilicate mesoporous material of the first layer is made by a process comprising:
stirring cetyltrimethylammonium bromide, sodium hydroxide, and water to form a first mixture;
adding tetraethyl orthosilicate to the first mixture to form a second mixture;
adding $N^1$-(3-trimethoxysilylpropyl)diethyltriamine to the second mixture to form a third mixture;
centrifuging the third mixture;
decanting an organic solution from the third mixture to leave a substance; and
drying the substance to form the triamine-functionalized polysilicate mesoporous material of the first layer.

12. The filtration membrane of claim 1, wherein the triamine-functionalized polysilicate mesoporous material may be functionalized with the silicon-containing triamine during an in situ procedure of the synthesis of the hierarchical structure of MCM-41 and a post-synthesis procedure of the synthesis of the hierarchical structure of MCM-41.

13. The filtration membrane of claim 1, wherein the membrane is made by a process comprising:
mixing the triamine-functionalized polysilicate mesoporous material, N,N'-bis(3-aminopropyl)ethylenediamine, triethylamine, and water to form an amine solution;
sonicating the amine solution;
dissolving terephthaloyl chloride in an n-hexane to form a crosslinker solution;
casting the polysulfone on the polyester terephthalate with wet phase inversion to form a support;
attaching the support to a glass surface to form a base foundation;
dipping the base foundation in the amine solution to form a complex; and
dipping the complex in the crosslinker solution to form the membrane.

14. The filtration membrane of claim 1, wherein the first layer has a uniform, globular morphology with an average particle size of 10 to 80 nanometers in diameter.

15. A method of filtration, comprising:
wetting the filtration membrane of claim 1;
contacting the filtration membrane with a contaminated solution,
wherein the contaminated solution comprises at least water and one or more pollutants,
collecting a permeate passing through the filtration membrane to obtain a purified composition having a reduced amount of pollutants.

16. The method of claim 15, wherein contacting the filtration membrane with the results in a rejection percentage of 50 to 97 percent based on an initial weight of the pollutant at a pressure of 15 bar, wherein the one or more pollutants is an ionic salt.

17. The method of claim 15, wherein contacting the filtration membrane with the contaminated solution results in a rejection percentage of 35 to 95 percent based on an initial weight of the pollutant at a pressure of 15 bar, wherein the one or more pollutants is a pharmaceutically active compound.

18. The method of claim 15, wherein the one or more pollutants is one or more ionic salts selected from the group consisting of $MgCl_2$, $CaCl_2$, $MgSO_4$, $Na_2SO_4$, and NaCl.

19. The method of claim 15, wherein the one or more pollutants is one or more pharmaceutically active compounds selected from the group consisting of caffeine, sulfamethoxazole, amitriptyline, and loperamide.

20. The filtration membrane of claim 1, wherein the membrane is adapted for a use selected from the use group consisting of oil and water separation, water treatment, desalination, and pharmaceutical filtration.

* * * * *